United States Patent
Park et al.

(10) Patent No.: US 9,706,524 B2
(45) Date of Patent: Jul. 11, 2017

(54) METHOD OF PERFORMING SCHEDULING FOR D2D MULTICAST COMMUNICATION IN WIRELESS COMMUNICATION SYSTEM AND APPARATUS THEREFOR

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Kungmin Park, Seoul (KR); Hyunsuk Lee, Seongnam-si (KR); Jangwon Lee, Seoul (KR); Hyunsoo Ko, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 227 days.

(21) Appl. No.: 14/640,842

(22) Filed: Mar. 6, 2015

(65) Prior Publication Data

US 2016/0192326 A1   Jun. 30, 2016

(30) Foreign Application Priority Data

Dec. 24, 2014  (KR) .................. 10-2014-0188240
Dec. 24, 2014  (KR) .................. 10-2014-0188241
Dec. 24, 2014  (KR) .................. 10-2014-0188242

(51) Int. Cl.
*H04W 72/00* (2009.01)
*H04W 4/06* (2009.01)
(Continued)

(52) U.S. Cl.
CPC ......... *H04W 72/005* (2013.01); *H04L 12/189* (2013.01); *H04W 4/06* (2013.01); *H04L 12/1881* (2013.01); *H04W 72/1231* (2013.01)

(58) Field of Classification Search
None
See application file for complete search history.

(56) References Cited

U.S. PATENT DOCUMENTS

| 7,092,402 B1 * | 8/2006 | Smith | H04L 1/203 370/437 |
| 2008/0152061 A1 * | 6/2008 | Kozat | H04L 1/0002 375/358 |

(Continued)

*Primary Examiner* — Anh-Vu Ly
*Assistant Examiner* — Roberta A Shand
(74) *Attorney, Agent, or Firm* — Lee Hong Degerman Kang Waimey

(57) ABSTRACT

According to one embodiment of the present invention, the method of performing scheduling for D2D multicast communication, which is performed by a base station in a wireless communication system, includes the steps of receiving channel state measurement information from each of D2D reception UEs belonging to one or more multicast groups, generating representative information on each of the one or more multicast groups based on the received channel state measurement information and average data transmission rate demand information of each of the D2D reception UEs, performing scheduling by assigning a sub channel on which the D2D multicast communication is to be performed to each of the one or more multicast groups based on the generated representative information and transmitting a scheduling signal including information on the assigned sub channel to each UE belonging to the one or more multicast groups.

18 Claims, 8 Drawing Sheets

(51) Int. Cl.
   *H04L 12/18*   (2006.01)
   *H04W 72/12*   (2009.01)

(56) References Cited

U.S. PATENT DOCUMENTS

| | | | | |
|---|---|---|---|---|
| 2011/0194419 | A1* | 8/2011 | Lee | H04H 20/423 370/242 |
| 2012/0083283 | A1* | 4/2012 | Phan | H04W 72/048 455/450 |
| 2012/0163252 | A1* | 6/2012 | Ahn | H04L 1/0003 370/280 |
| 2014/0004867 | A1* | 1/2014 | Noh | H04W 76/023 455/450 |
| 2014/0064203 | A1* | 3/2014 | Seo | H04W 28/06 370/329 |
| 2014/0098719 | A1* | 4/2014 | Kim | H04W 4/008 370/280 |
| 2014/0133303 | A1* | 5/2014 | Jia | H04L 1/0002 370/232 |
| 2014/0153390 | A1* | 6/2014 | Ishii | H04W 76/023 370/230 |
| 2014/0219095 | A1* | 8/2014 | Lim | H04W 72/085 370/235 |
| 2014/0328299 | A1* | 11/2014 | Kalhan | H04W 76/023 370/329 |

\* cited by examiner

METHOD OF PERFORMING SCHEDULING FOR D2D MULTICAST COMMUNICATION IN WIRELESS COMMUNICATION SYSTEM AND APPARATUS THEREFOR

Pursuant to 35 U.S.C. §119(a), this application claims the benefit of earlier filing date and right of priority to Korean Patent Application Nos. 10-2014-0188240, 10-2014-0188241, and 10-2014-0188242, filed on Dec. 24, 2014, the contents of which are all hereby incorporated by reference herein in their entirety.

BACKGROUND OF THE INVENTION

Field of the Invention

The present invention relates to a wireless communication system, and more particularly, to a method of performing scheduling for D2D (device to device) multicast communication in a wireless communication and an apparatus therefor.

Discussion of the Related Art

Recently, as a smartphone and a tablet PC (personal computer) are disseminated and a high-capacity multimedia communication is activated, mobile traffic is rapidly increasing. Hence, tendency of increase of the mobile traffic is expected to be doubled in every year in the future.

Since most of the mobile traffic is transmitted via a base station, communication service providers are facing a serious network load problem right now. In order to process the increasing traffic, the communication service providers have increased a network facility and have been commercializing such a next generation mobile communication standard capable of efficiently processing a great amount of traffic as mobile WiMAX, LTE and LTE-A. Yet, it is necessary for the service providers to have a different solution to cope with the amount of traffic to be rapidly increased. Hence, the service providers have started to take into consideration D2D communication.

When one or more user equipments are positioned at a distance adjacent to each other, the D2D (device-to-device) communication corresponds to a short-range communication scheme that delivers traffic via direct communication between the user equipments without passing through a base station. The D2D communication corresponds to a technology actively studied in recent years.

In case of performing the D2D communication, it may consider not only unicast communication of which two user equipments are directly communicating with each other via a single D2D link but also D2D multicast communication of which a single D2D user equipment delivers identical data to a neighboring plurality of D2D user equipments with a single transmission.

A representative service, which is expected to utilize the D2D multicast communication, may include an SNS (social network service), an advertising service and the like. The services are expected to be served by utilizing multimedia in the future.

In order to support a multimedia service including music, video streaming and the like in the D2D multicast communication, it is necessary to satisfy a demand on an average data transmission rate of a user, i.e., prescribed data transmission traffic per unit time. Since the multimedia service requires relatively high data transmission rate, efficient use of a radio resource is essential. Hence, it is required to have a scheduling method capable of securing an average data transmission rate of a D2D reception user equipment and efficiently utilizing a radio resource in the D2D multicast communication.

And, in order to perform the required scheduling method, the D2D reception user equipment may directly transmit channel state measurement information to a base station. In this case, it is not only necessary to maintain a strong point of the scheduling method while a resource necessary for transmitting the channel state measurement information is efficiently used by utilizing a structural merit of the D2D multicast communication (i.e., a group is formed in near distance and a signal is transmitted), it is also necessary to reduce scheduling complexity of a base station.

Moreover, in order to perform the required scheduling method, the base station should receive a report on channel state measurement information between all D2D reception user equipments and all D2D transmission user equipments belonging to a wireless communication system.

In doing so, since signaling overhead for transmitting the channel state measurement information is huge in a transmitting side and a base station, which is a receiving side, should perform scheduling using all channel state measurement information, it is necessary to reduce an amount of the channel state measurement information which is transmitted to perform the scheduling.

SUMMARY OF THE INVENTION

Accordingly, the present invention is directed to an apparatus and method thereof that substantially obviate one or more problems due to limitations and disadvantages of the related art.

An object of the present invention is to propose a method of performing scheduling for D2D multicast communication in a wireless communication system.

Another object of the present invention is to propose a scheduling method of a base station capable of securing an average transmission rate of D2D reception user equipments and efficiently using a radio resource.

Another object of the present invention is to propose a method of reducing an amount of resources used for transmitting channel state measurement information and a method of reducing scheduling complexity of a base station in a manner that a D2D transmission user equipment processes the channel state measurement information used for scheduling D2D multicast communication and transmits the channel state measurement information to the base station.

Another object of the present invention is to propose a scheduling method capable of securing an average transmission rate of D2D reception user equipments while scheduling complexity of a base station is reduced and efficiently using a radio resource in a manner that a D2D user equipment selectively reports channel state measurement information used for scheduling D2D multicast communication.

Another object of the present invention is to propose an apparatus supporting the aforementioned methods.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of performing scheduling for D2D multicast communication, which is performed by a base station in a wireless communication system, includes the steps of receiving channel state measurement information from each of D2D reception UEs belonging to one or more multicast groups, generating representative information on each of the one or more multicast groups based on the received channel state measurement information and average data transmission rate demand information of each of the D2D reception UEs, performing scheduling by assigning a sub channel on which the D2D multicast communication is to be performed to each of the one or more multicast groups based on the generated representative information and transmitting a scheduling signal including information on the assigned sub channel to each UE belonging to the one or more multicast groups.

Each of the one or more multicast groups can include one D2D transmission UE and one or more D2D reception UEs and the average data transmission rate demand information can include information on a predetermined amount of data reception demand per unit time of the D2D reception UE.

The method can further include the steps of determining a reuse set to use each of one or more sub channels in the wireless communication system at the same time according to the sub channel based on the representative information and performing scheduling by assigning the sub channel based on the determined one or more reuse sets.

The reuse set can be determined by a set of multicast groups of which sum of the representative information is biggest among sets of one or more multicast groups to simultaneously use a specific sub channel among the one or more sub channels.

The scheduling performing step can further include the step of comparing sum of representative information between one or more multicast groups included in the determined reuse set with a predetermined system constant and if the sum of the representative information of the reuse set is greater than the system constant, a sub channel corresponding to the reuse set can be dynamically used for a different communication rather than the D2D communication.

The method can further include the steps of receiving transmission rate measurement information including information on whether data is successfully received and information on an amount of received data from each of the D2D reception UEs, which has performed data communication, belonging to the one or more multicast groups based on the assigned sub channel and updating average data transmission rate demand information for each of the D2D reception UEs belonging to the one or more multicast groups based on the transmission rate measurement information.

To further achieve these objects and other advantages and in accordance with the purpose of the invention, as embodied and broadly described herein, according to a different embodiment, a method of transmitting a signal for D2D multicast communication scheduling, which is transmitted by a D2D (device-to-device) transmission UE belonging to a multicast group in a wireless communication system, includes the steps of receiving channel state measurement information from each of D2D reception UEs belonging to the multicast group, generating one or more representative information on the multicast group based on the received channel state measurement information and average data transmission rate demand information of each of the D2D reception UEs, determining a single main representative information to be transmitted to a base station according to a predetermined criterion among the generated representative information and transmitting a representative information report signal including the determined main representative information to the base station.

The channel state measurement information includes identifier information of a transmission UE causing $m^{th}$ strong interference to the D2D reception UE on a specific sub channel among one or more sub channels in the wireless communication system and information on a data transmission rate when transmission UEs except transmission UEs ranging from a transmission UE causing strongest interference to the transmission UE causing the $m^{th}$ strong interference among transmission UEs cause interference on each of the one or more sub channels and a value of the m can be determined by the D2D reception UE according to network performance of the wireless communication system.

The predetermined criterion is to determine the main representative information using a representative information parameter controlling a trade-off between the number of interference sets and a weighted achievable sum-rate and the representative information parameter can be received from the base station.

The transmitted main representative information is used for determining a reuse set to simultaneously use each of one or more sub channels in the wireless communication in the base station according to the sub channel and performing scheduling by assigning the sub channel based on the one or more determined reuse sets and the reuse set can be determined by a set of a multicast group of which sum of the main representative information is biggest among sets of one or more multicast groups to simultaneously use a specific sub channel among the one or more sub channels.

Each of reception of the channel state measurement information and transmission of the representative information report signal can be performed on a control channel (D2DCCH) predetermined for the D2D communication or a channel predetermined for the D2D communication on a physical uplink shared channel (PUSCH).

The method can further include the steps of receiving transmission rate measurement information including information on whether data is successfully received and information on an amount of received data from each of the D2D reception UEs, which has performed data communication, belonging to the multicast group based on the main representative information and updating average data transmission rate demand information for each of the D2D reception UEs belonging to the multicast group based on the transmission rate measurement information.

To further achieve these objects and other advantages and in accordance with the purpose of the invention, as embodied and broadly described herein, according to a further different embodiment, a method of transmitting a channel state measurement signal for D2D multicast communication scheduling, which is transmitted by a D2D (device-to-device) reception UE belonging to a multicast group in a wireless communication system, includes the steps of measuring a channel state of each of sub channels used for performing D2D communication with a D2D transmission UE belonging to one or more multicast groups, generating a channel state measurement signal for the D2D multicast communication scheduling using the measured channel state and transmitting the generated channel state measurement signal to a base station, wherein the channel state measurement signal can include identifier information of a transmission UE causing strongest interference on each of the sub channels and information on a data transmission rate when different transmission UEs except the transmission UE causing the strongest interference on each of the sub channels cause interference.

The channel state measurement information further includes identifier information of a transmission UE causing $m^{th}$ strong interference on each of the sub channels and information on a data transmission rate when different transmission UEs except transmission UEs ranging from the transmission UE causing the strongest interference to the transmission UE causing $m^{th}$ strong interference on each of the sub channels cause interference and a value of the m can be determined by the D2D reception UE according to network performance of the wireless communication system.

The transmitted channel state measurement information is used for the base station to generate average data transmission rate demand information of the D2D reception UE and representative information for each of the one or more multicast groups, the average data transmission rate demand information includes information on a predetermined amount of data reception demand per unit time and the representative information can be generated as many as the number corresponding to the value of the m.

The generated representative information can be used for determining a reuse set to simultaneously use each of the sub channels in the base station according to the sub channel and performing scheduling by assigning the sub channel based on the determined one or more reuse sets.

Transmission rate measurement information including information on whether data is successfully received and information on an amount of received data is transmitted to the base station after data communication is performed on the assigned sub channel based on the representative information and the transmission rate measurement information can be used for the base station to update the average data transmission rate demand information.

To achieve these objects and other advantages and in accordance with the purpose of the invention, as embodied and broadly described herein, according to one embodiment, a device performing scheduling for D2D (device-to-device) multicast communication in a wireless communication system, includes an RF (radio frequency) unit configured to include a transmission unit and a reception unit and a processor configured to support communication performance of the device in a manner of being connected with the transmission unit and the reception, the processor configured to receive channel state measurement information from each of D2D reception UEs belonging to one or more multicast groups, the processor configured to generate representative information on each of the one or more multicast groups based on the received channel state measurement information and average data transmission rate demand information of each of the D2D reception UEs, the processor configured to perform scheduling by assigning a sub channel on which the D2D multicast communication is to be performed to each of the one or more multicast groups based on the generated representative information, the processor configured to control a scheduling signal including information on the assigned sub channel to be transmitted to each UE belonging to the one or more multicast groups To further achieve these objects and other advantages and in accordance with the purpose of the invention, as embodied and broadly described herein, according to a different embodiment, a device transmitting a signal for D2D multicast communication scheduling in a wireless communication system includes an RF (radio frequency) unit configured to include a transmission unit and a reception unit and a processor configured to support communication performance of the device in a manner of being connected with the transmission unit and the reception, the processor configured to receive channel state measurement information from each of D2D reception UEs belonging to the multicast group, the processor configured to generate one or more representative information on the multicast group based on the received channel state measurement information and average data transmission rate demand information of each of the D2D reception UEs, the processor configured to determine a single main representative information to be transmitted to a base station according to a predetermined criterion among the generated representative information and the processor configured to transmit a representative information report signal including the determined main representative information to the base station.

To further achieve these objects and other advantages and in accordance with the purpose of the invention, as embodied and broadly described herein, according to a further different embodiment, a device transmitting a channel state measurement signal for D2D (device-to-device) multicast communication scheduling in a wireless communication system includes an RF (radio frequency) unit configured to include a transmission unit and a reception unit and a processor configured to support communication performance of the device in a manner of being connected with the transmission unit and the reception, the processor configured to measure a channel state of each of sub channels used for performing D2D communication with a D2D transmission UE belonging to one or more multicast groups, the processor configured to generate a channel state measurement signal for the D2D multicast communication scheduling using the measured channel state, the processor configured to control the generated channel state measurement signal to be transmitted to a base station, wherein the channel state measurement signal includes identifier information of a transmission UE causing strongest interference on each of the sub channels and information on a data transmission rate when different transmission UEs except the transmission UE causing the strongest interference on each of the sub channels cause interference.

According to an embodiment of the present invention, a method of performing scheduling for D2D multicast communication in a wireless communication system can be provided.

According to an embodiment of the present invention, a scheduling method of a base station capable of securing an average transmission rate of D2D reception user equipments and efficiently using a radio resource can be provided.

According to an embodiment of the present invention, a method of reducing an amount of resources used for transmitting channel state measurement information and a method of reducing scheduling complexity of a base station can be provided in a manner that a D2D transmission user equipment processes the channel state measurement information used for scheduling D2D multicast communication and transmits the channel state measurement information to the base station.

According to an embodiment of the present invention, a scheduling method capable of securing an average transmission rate of D2D reception user equipments while scheduling complexity of a base station is reduced and efficiently using a radio resource can be provided in a manner that a D2D user equipment selectively reports channel state measurement information used for scheduling D2D multicast communication.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

In the present application, such a terminology as 'comprise', 'include' and the like should be construed not as necessarily excluding various components or steps written in the present specification but as including the components or steps in part or further including additional components or steps.

And, such a terminology as 'unit' written in the present specification indicates a unit processing at least one function or an operation and can be implemented by hardware, software or a combination thereof. Moreover, "a or an", "one" or a similar related word can be used as a meaning including both a singular number and a plural number unless it is clearly contradicted to a context of the present invention.

Specific terminologies used in the following description are provided to help understand the present invention and have a meaning identical to a meaning generally understood by those skilled in the technical field to which the present invention belongs thereto. The use of the specific terminologies can be modified into a different form in a range of not deviating from the technical idea of the present invention.

Moreover, a terminology, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components. For instance, a $1^{st}$ component may be named a $2^{nd}$ component while coming within the scope of the appended claims and their equivalents. Similarly, the $2^{nd}$ component may be named the $1^{st}$ component.

In the following description, a preferable embodiment according to the present invention is explained in detail with reference to the attached drawings. Detailed explanation to be explained with reference to attached drawings is intended to show not a unique embodiment but an exemplary embodiment of the present invention.

Figure 1:
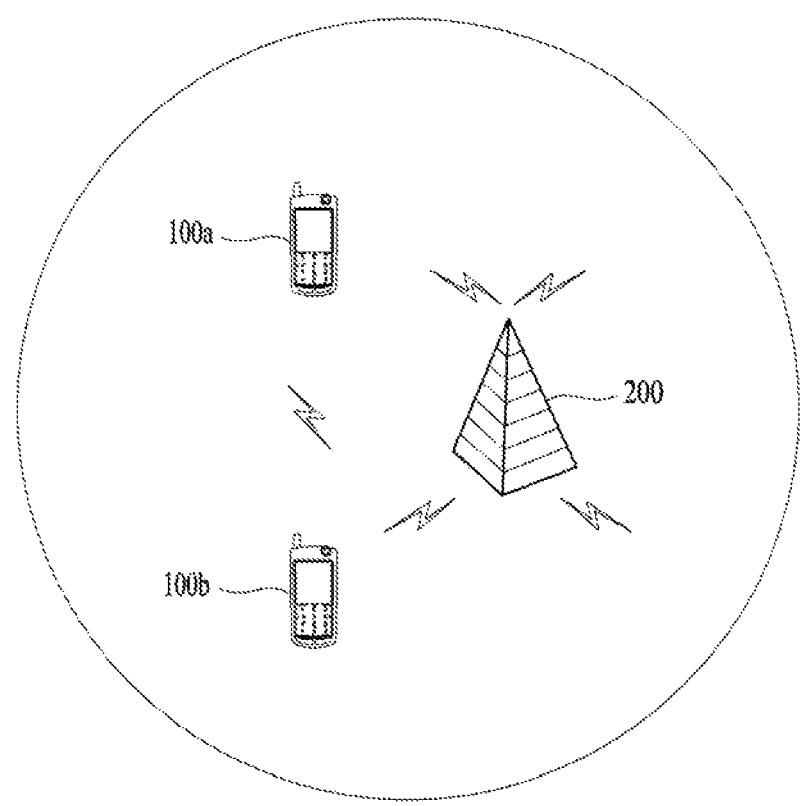
FIG. 1 is a diagram for an example of a general wireless communication system to which the present invention is applicable.

FIG. 1 is a diagram for an example of a general wireless communication system to which the present invention is applicable.

Referring to FIG. 1, a general wireless communication system to which the present invention is applicable can includes one or more user equipments (UE) 100a/100b and a base station (BS) 200. Unlike FIG. 1, the wireless communication system can include one or more UEs and one or more BSs.

In the present invention, a base station 200 may be meaningful as a terminal node of a network which directly performs communication with the user equipment 100a/100b. In this disclosure, a specific operation explained as performed by a base station 200 may be performed by an upper node of the base station in some cases.

In particular, in a network constructed with a plurality of network nodes including a base station 200, it is apparent that various operations performed for communication with a user equipment can be performed by a base station or other network nodes except the base station.

In the present invention, a base station (BS) 200 may be substituted with such a terminology as a fixed station, a Node B, an eNode B (eNB), an access point (AP) and the like.

And, a user equipment 100a/100b may be substituted with such a terminology as a terminal, a mobile station (MS), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device and the like.

Embodiments of the present invention can be implemented in at least one of wireless access systems including IEEE 802 system, 3GPP system, 3GPP LTE and LTE-A (LTE-Advanced) system and 3GPP2 system and at least one of the embodiments may be supported by the disclosed standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like.

CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution).

OFDMA can be implemented with such a radio technology as IEEE 802.11 (Wi-Fi), IEEE 802.16 (WiMAX), IEEE 802-20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE.

Figure 2:
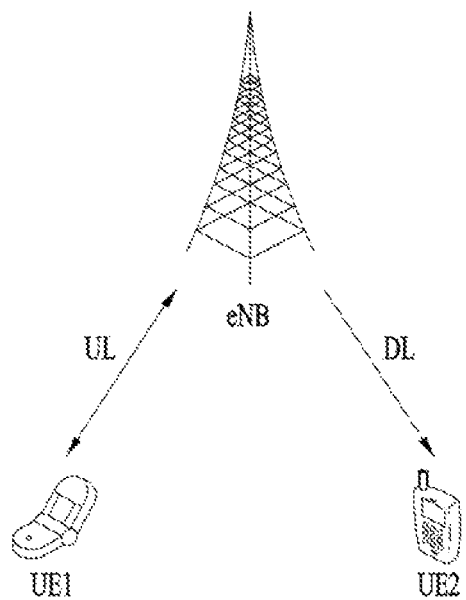
FIG. 2(a) is a diagram for conceptually explaining D2D communication in a wireless communication system.
FIG. 2(b) is a diagram for conceptually explaining D2D communication in a wireless communication system.
Figure 2:
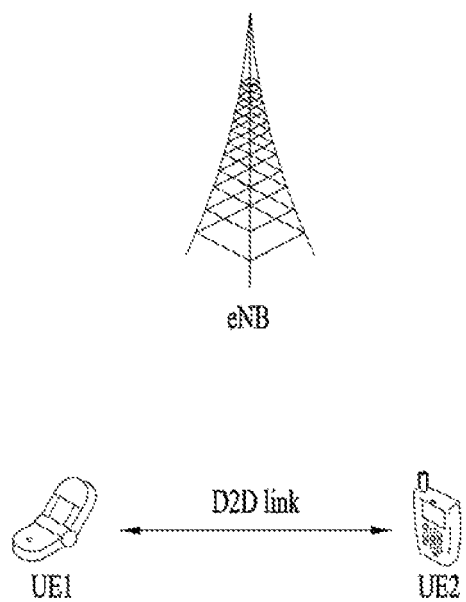

FIG. 2(a) and FIG. 2(b) are diagrams for conceptually explaining D2D communication in a wireless communication system.

First of all, referring to FIG. 2(a), it shows a legacy communication scheme performed on the basis of a base station (eNB).

A UE 1 transmits data to the base station (eNB) in uplink (hereinafter abbreviated UL) and the base station can transmit the data received from the UE 1 to a UE 2 in downlink (hereinafter abbreviated DL).

Referring to FIG. 2(b), it shows a UE-to-UE communication scheme as an example of D2D communication. Data exchange between the UE 1 and the UE 2 can be performed between the UEs without passing through the base station (eNB).

A link directly configured between devices can be called a D2D link. A scheme of exchanging data between UEs using the D2D link can be called D2D communication.

The D2D communication may reduce latency compared to the legacy communication scheme performed on the basis of a base station and may require less radio resource.

Although FIG. 2(b) shows a type of one to one, the D2D communication can be performed in a type of one to multi, a type of multi to one or a type of multi to multi. For clarity, assume that the D2D communication is performed in the type of one to multi in the present invention.

Figure 3:
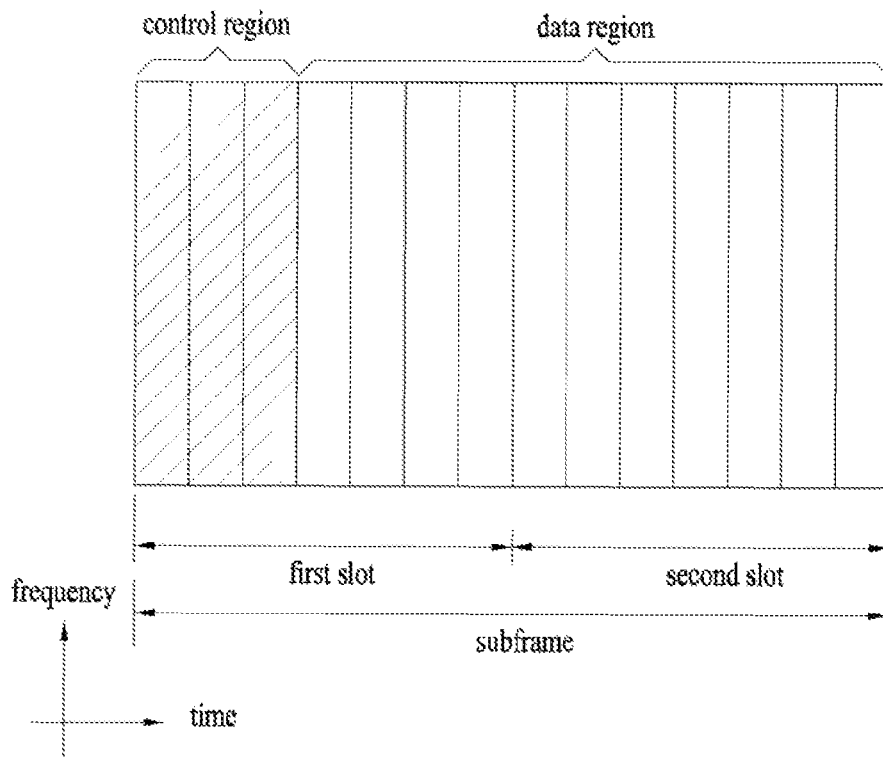
FIG. 3 is a diagram for an example of a downlink subframe structure in LTE.

FIG. 3 is a diagram for an example of a downlink subframe structure in LTE.

Referring to FIG. 3, a DL subframe used in LTE can include two slots. 3 OFDM symbols situated in a head part of a first slot of one subframe correspond to a control region to which control channels are assigned. The rest of OFDM symbols correspond to a data region to which PDSCH (physical downlink shared channel) is assigned.

Examples of DL control channels used in LTE may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols used for transmitting a control channel in the subframe. The PHICH carries ACK (acknowledgement)/NACK (none-acknowledgement) signal in response to UL transmission.

Control information carried on the PDCCH is called downlink control information (hereinafter abbreviated DCI). The DCI includes resource allocation information for a UE or a UE group and different control information. For instance, the DCI includes UL/DL scheduling information, UL transmit (Tx) power control command, and the like.

PDCCH is able to carry a transmission format and resource allocation information of DL-SCH (downlink shared channel), a transmission format and resource allocation information of UL-SCH (uplink shared channel), paging information on PCH (paging channel), system information on DL-SCH, resource allocation information of an upper layer control message such as a random access response transmitted on PDSCH, a transmit power control command set for individual user equipments belonging to a user equipment (UE) group, a transmit power control command, activation indication information of VoIP (voice over IP) and the like.

A plurality of PDCCHs can be transmitted in a control region and a user equipment is able to monitor a plurality of the PDCCHs. PDCCH is transmitted on an aggregation of a plurality of contiguous control channel elements (CCEs).

A CCE is a logical assignment unit used to provide PDCCH with a code rate in accordance with a state of a radio channel. CCE corresponds to a plurality of REGs (resource element groups).

A format of PDCCH and the number of bits of PDCCH are determined depending on the number of CCEs. A base station determines a PDCCH format in accordance with DCI to be transmitted to a user equipment and attaches CRC (cyclic redundancy check) to control information.

The CRC is masked with an identifier (e.g., RNTI (radio network temporary identifier)) in accordance with an owner or usage of PDCCH. If the PDCCH is provided for a specific user equipment, the CRC can be masked with an identifier of the corresponding user equipment, i.e., C-RNTI (i.e., Cell-RNTI). As a different example, if the PDCCH is provided for a paging message, the CRC can be masked with a paging identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). If the PDCCH is provided for a random access response, the CRC can be masked with RA-RNTI (random access-RNTI).

Figure 4:
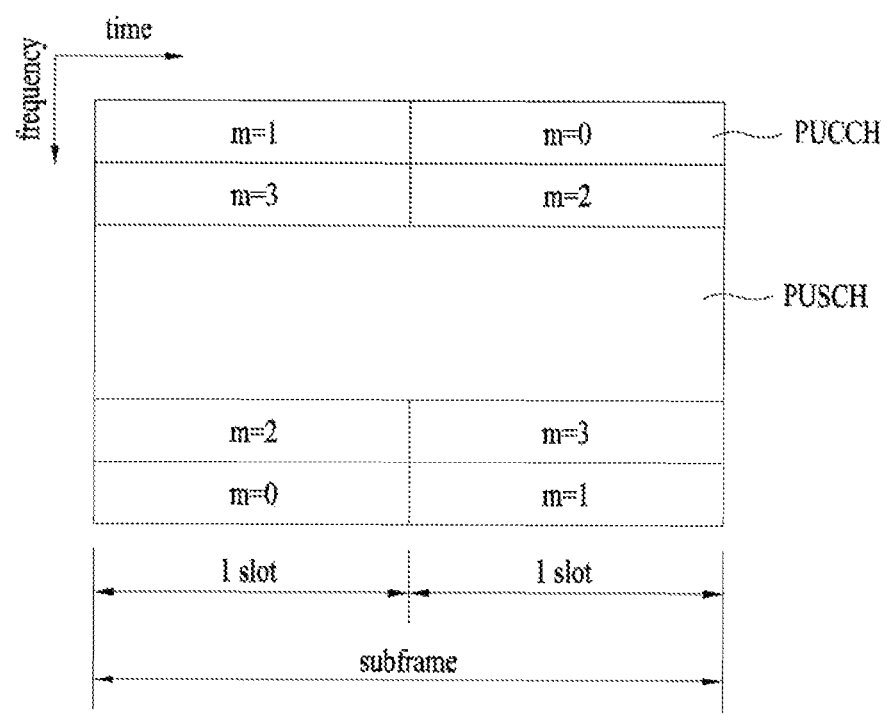
FIG. 4 is a diagram for an example of an uplink subframe structure in LTE.

FIG. 4 is a diagram for an example of an uplink subframe structure in LTE.

Referring to FIG. 4, a UL subframe may include two slots. A slot may include SC-FDMA symbols of a different number according to a CP length.

A UL subframe can be divided into a data region and a control region in frequency domain. The data region includes PUSCH (physical uplink shred channel) and is used to transmit data signal such as audio and the like. The control region includes PUCCH (physical uplink control channel) and is used to transmit UCI (uplink control information). In this case, the PUCCH includes an RB pair situating at both ends of the data region in a frequency axis and hops on a slot boundary.

The PUCCH can be used to transmit following control information.

SR (scheduling request): information used to request UL-SCH resource. This information is transmitted using OOK (on-off keying) scheme.

HARQ ACK/NACK: a response signal transmitted in response to a DL data packet on PDSCH. This information indicates whether a DL data packet is successfully received. ACK/NACK 1 bit is transmitted in response to a single DL codeword. ACK/NACK 2 bits are transmitted in response to two DL codewords.

CSI (channel state information): feedback information for a DL channel. CSI includes a CQI (channel quality indicator) and MIMO (multiple input multiple output)-related feedback information includes an RI (rank indicator), a PMI (precoding matrix indicator), a PTI (precoding type indicator) and the like. 20 bits are used per a subframe.

The amount of control information (UCI) capable of being transmitted by a user equipment in a subframe depends on the number of SC-FDMA available for transmitting the control information. The SC-FDMA available for transmitting the control information indicates remaining SC-FDMA symbols except SC-FDMA symbol used for transmitting a reference signal in the subframe. In case of a subframe to which an SRS (sounding reference signal) is set, a last SC-FDMA of the subframe is also excluded from the available SC-FDMA. A reference signal is used for coherent detection of PUCCH.

Figure 5:
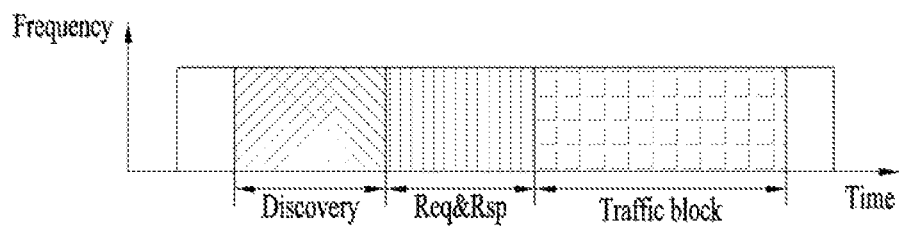
FIG. 5 is a diagram for an example of a frame structure for D2D communication.

FIG. 5 is a diagram for an example of a frame structure for D2D communication.

D2D communication is performed using a frame structure shown in FIG. 5. A frame shown in FIG. 5 can include a discovery interval, a request and response interval, and a traffic block interval.

A UE capable of performing D2D communication or a UE (hereinafter called a D2D UE) performing D2D communication can determine whether there exist neighboring D2D UEs via the discovery interval.

In order to perform D2D communication, a D2D UE can perform such an operation as transmission and reception of a transmission request signal, transmission of a D2D request transmitted to a base station and reception of resource allocation (RA) information and the like via the request and response interval.

A name or a title of each interval shown in FIG. 5 is just an example. The name or the title can be named by a different terminology. And, unlike FIG. 5, an operation region for a D2D UE can be defined by frequency instead of time.

A D2D UE can receive information (e.g., interval length (discovery interval length and request and response interval length), a period, information on the number of symbol/slot/subframe, information on a start point (information on an index of symbol/slot/subframe and the like) on a frame structure for the D2D communication from a base station via a broadcast channel (e.g., PBCH (physical broadcasting channel)), a control channel (e.g., PDCCH (physical downlink control channel)) or the like.

In order for the D2D UE to identify a neighboring D2D UE before performing D2D communication, the D2D UE can perform D2D discovery. For the D2D discovery, two operation can be mainly performed.

As a first operation, the D2D UE receives a discovery signal, which is transmitted by neighboring D2D UEs via a broadcast signal, and obtains identifier information on the D2D UEs via the received discovery signal. By doing so, the D2D UE is able to know whether there exist different D2D UEs in the vicinity of the D2D UE.

As a second operation, the D2D UE broadcasts identifier information of the D2D UE via a discovery signal and informs neighboring D2D UE of existence of the D2D UE. In this case, the discovery signal broadcasted by the D2D UE can be transmitted using a resource (i.e., an empty resource) in a broadcast channel not used by different D2D UEs for transmitting a discovery signal.

Figure 6:
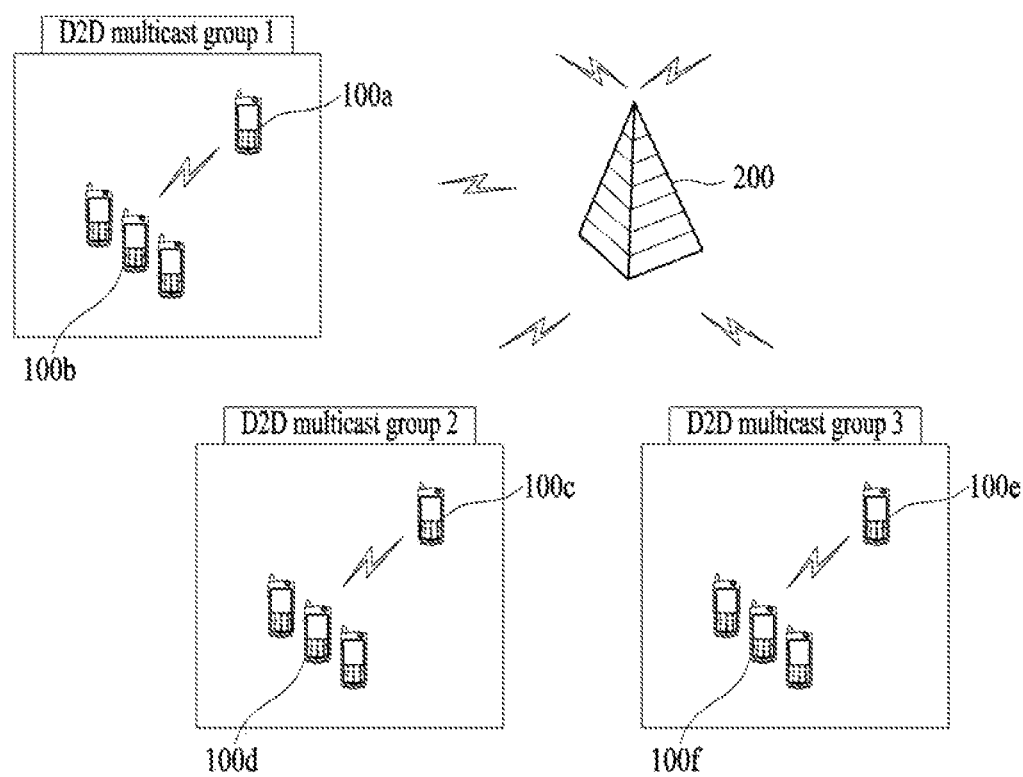
FIG. 6 is a diagram for explaining a D2D multicast group according to one embodiment of the present invention.

FIG. 6 is a diagram for explaining a D2D multicast group according to one embodiment of the present invention.

As mentioned in the foregoing description, D2D (device-to-device) communication indicates a short-range communication scheme enabling UEs to perform direct communication between the UEs without passing through a base station when the UEs are positioned at a near distance with each other. In case of performing the D2D communication, it may consider not only unicast communication of which two D2D UEs are directly communicating with each other via a single D2D link but also D2D multicast communication of which a single D2D UE delivers identical data to a plurality of D2D UEs positioned in the vicinity of the D2D UE with a single transmission.

As shown in FIG. 6, a wireless communication system according to the present invention can include one or more UEs 100a/100b/100c/100d/100e/100f and a base station 200. D2D multicast communication can be implemented in the wireless communication system.

In the D2D multicast communication, assume that one D2D multicast group (a D2D multicast group 1, a D2D multicast group 2 and a D2D multicast group 3) includes one D2D transmission UE (100a, 100c or 100e) and one or more D2D reception UEs (100, 100d or 100f). The D2D multicast communication can be performed in a manner that one D2D transmission UE transmits identical data to a plurality of D2D reception UEs with a single transmission in each group.

Hence, scheduling of D2D multicast communication can be performed according to a D2D multicast group. In other word, the scheduling of the D2D multicast communication is performed by determining a D2D multicast group using a sub channel.

Since a plurality of D2D reception UEs are included in each D2D multicast group, in order to secure an average data transmission rate of the D2D reception UEs, i.e., constant data transmission traffic per unit time, it is necessary to calculate the extent of scheduling demand capable of representing a corresponding D2D multicast group in consideration of satisfaction of an average data transmission rate of each D2D reception UE and it is necessary to perform scheduling by utilizing corresponding information.

Since a channel status between a D2D transmission UE and a D2D reception UE is variable according to time, if a D2D multicast group of a good channel status is selected and scheduled on a moment of performing the scheduling, overall resource efficiency of a system can be enhanced.

If scheduling is performed in consideration of both the extent of scheduling demand of a D2D multicast group, which is calculated in consideration of satisfaction of average data transmission rate of a D2D reception UE, and a channel status of the D2D multicast group at the same time, average data transmission rate of the D2D reception UEs can be secured and the amount of resource used for the D2D multicast communication can be minimized as well.

Hence, the present invention proposes a scheduling method capable of not only securing an average data transmission rate but also minimizing a resource used for D2D multicast communication in consideration of both information indicating the extent of scheduling demand of a D2D multicast group and a channel status of each D2D multicast group. In the following, the scheduling method is explained in more detail.

Figure 7:
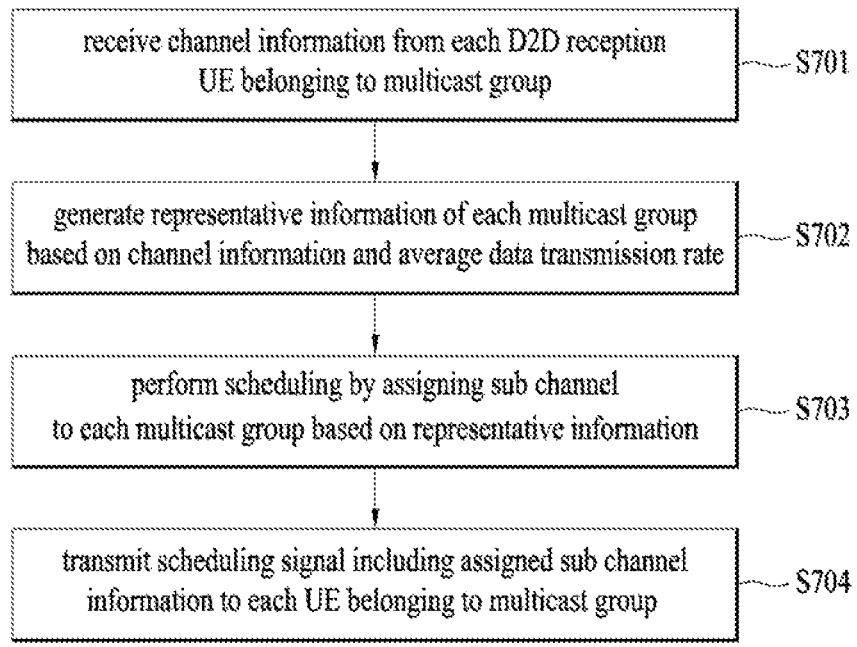
FIG. 7 is a flowchart for a method of performing scheduling for D2D multicast communication according to one embodiment of the present invention.

FIG. 7 is a flowchart for a method of performing scheduling for D2D multicast communication according to one embodiment of the present invention.

Prior to explanation of FIG. 7, as mentioned earlier in FIG. 6, assume a situation that there exist one or more D2D multicast groups in D2D communication including multicast communication.

And, each D2D multicast group can include one D2D transmission UE and one or more D2D reception UEs. If there exists one D2D reception UE only in the group, it may be considered as communication identical to unicast communication.

In the present invention, scheduling means to determine multicast groups simultaneously using each sub channel in every time slot when there exist sub channels available for D2D multicast communication. In particular, when a sub channel is assigned to a multicast group, there may exist one or more multicast groups different from each other using the sub channel.

For clarity, a D2D multicast group indicates a multicast group and a set of the multicast groups using or capable of using each sub channel at the same time indicates a reuse set in the present invention.

In this case, since the reuse set corresponds to a set of the multicast groups using the sub channel at the same time, the reuse set may correspond to a subset of a set including all multicast groups participating in D2D multicast communication.

Moreover, since the present invention considers D2D communication only, for clarity, a D2D reception UE and a D2D transmission UE indicate a reception UE and a transmission UE, respectively.

Meanwhile, the present invention intends to propose a method for a base station to dynamically manage a radio resource used for D2D communication in a manner that the base station secures average transmission rate of D2D UEs belonging to a D2D multicast group and determines whether to use each sub channel for D2D multicast communication in every time slot and a method of determining a D2D multicast group capable of using each sub channel at the same time.

To this end, the present invention proposes a method for a base station to manage and update average data transmission rate satisfaction of D2D reception UEs, a method for the base station to generate representative information of each multicast group using the average data transmission rate satisfaction of D2D reception UEs and schedule using the representative information, a method of dynamically managing a resource, and a method of transmitting a signal.

Referring to FIG. 7, when reception UEs are able to measure channel information transceived with all transmission UEs on all sub channels used for D2D communication via a channel measurement process for the D2D communication, the reception UEs can report the channel state measurement information (the channel information transceived with all of the transmission UEs on all sub channels) to the base station [S701].

More specifically, the channel state measurement information can include channel state information between a reception UE of each of the one or more multicast groups and a transmission UE of each of the one or more multicast groups.

And, the channel state measurement information can be transmitted and received on a control channel (D2DCCH) predetermined for the D2D communication or a channel predetermined for the D2D communication on a physical UL shared channel (PUSCH).

Meanwhile, the base station can generate representative information of each multicast group based on the received channel state measurement information and an average data transmission rate of the reception UEs [S702].

In particular, the base station generates the representative information of each multicast group using the received channel state measurement information and the average data transmission rate of the reception UEs. In this case, the representative information of a multicast group may have a different value according to each sub channel and a reuse set described in the following.

More specifically, if a sub channel corresponds to n and a reuse set corresponds to z, representative information of a multicast group k can be represented as Formula 1 in the following.

$$\xi_k(n, z) = \sum_{i \in u_k} \lambda_{k_i} \log_2\left(1 + \frac{h_{k_i,k}^n P}{N_0 + \Sigma_{j \in z/[k]} h_{k_i,j}^n p}\right) \quad \text{[Formula 1]}$$

And, variables included in Formula 1 can be defined as Table 1 in the following.

TABLE 1

| | |
|---|---|
| n | sub channel index |
| $k_i$ | $i^{th}$ reception UE of multicast group k |
| $U_k$ | set of reception UEs belonging to multicast group k |
| $h_{ki,j}^n$ | channel gain between transmission UE of multicast group j and $i^{th}$ reception UE of multicast group k in sub channel n |
| z | reuse set |
| $\xi_k$ (n, z) | representative information of multicast group k in sub channel n and reuse set z |
| p | Transmission poer |
| $N_0$ | Thermal noise |
| $\lambda_{ki}$ | Average data transmission rate satisfaction of $i^{th}$ reception UE of multicast group k |
| α | Step size |
| $R_{ki}^{(t)}$ | Average data transmission rate in corresponding time slot of $i^{th}$ reception UE of multicast group k |
| $Y_k$ | Average data transmission rate demanded by multicast group k |
| C | System constant used for determining whether to use sub channel |

In particular, the representative information of the multicast group indicates the extent of scheduling demand obtained by considering average data transmission rate capable of being obtained by each of multicast groups belonging to a reuse set in the reuse set including one or more multicast groups and a sub channel corresponding to the reuse group.

And, average data transmission rate demand information indicates a predetermined amount of data reception demand per unit time of the reception UE.

Meanwhile, after the representative information is generated according to the multicast group, the base station can perform scheduling by assigning a sub channel to each of multicast groups using the generated representative information [S703].

More specifically, in order for the base station to perform the scheduling, the base station can determine a reuse set capable of using each sub channel at the same time according to one or more sub channels of the wireless communication system using the generated representative information.

In this case, the base station should determine an optimized reuse set by utilizing the representative information of the multicast groups belonging to each of the reuse set determined according to a sub channel.

The representative information of the multicast group corresponds to a value in which the extent of scheduling demand of each group and a current channel state are considered. As the value is greater, it means that the extent of demand is bigger and the current channel state is better. Hence, an optimal reuse set of each sub channel corresponds to a reuse set of which the sum of the representative information of multicast groups belonging to the reuse set is biggest. In particular, an optimal reuse set z* in a sub channel n can be represented as Formula 2 in the following.

$$z^* = \underset{z}{\operatorname{argmax}} \sum_{k \in z} \xi_k(n, z) \quad \text{[Formula 2]}$$

In this case, if all reception UEs satisfy average data transmission rate without using a corresponding sub channel, the base station is able to dynamically utilize the sub channel for a different purpose without utilizing the sub channel for D2D multicast communication.

In particular, in order to determine whether all reception UEs satisfy the average data transmission rate without using the sub channel, the base station can use the representative information of the multicast groups. This is because the extent of scheduling demand of each group is reflected to the representative information.

Hence, if the sum of the representative information of the multicast groups included in the optimal reuse set is smaller than a system constant C predetermined in a system, it means that all reception UEs can satisfy the average data transmission rate without using a sub channel n.

Hence, if Formula 3 in the following is satisfied, the sub channel n is not used for D2D communication. Instead, the base station can dynamically utilize the sub channel n for a different communication (e.g., general wireless communication) rather than the D2D communication.

$$\sum_{k \in z^*} \xi_k(n, z^*) < C \quad \text{[Formula 3]}$$

On the contrary, if Formula 3 is not satisfied, in particular, if the sum of the representative information of the multicast groups included in the optimal reuse set is greater than the system constant C predetermined in a system, it means that all reception UEs can satisfy the average data transmission rate only when the sub channel n is used. Hence, the base station performs scheduling in a manner of assigning the sub channel n.

And, the base station can transmit a scheduling signal including the assigned sub channel to each UE belonging to a multicast group [S704]. The scheduling signal can be transmitted on a control channel (D2DCCH) predetermined for the D2D communication or a channel predetermined for the D2D communication on a physical DL shared channel (PDSCH).

Although it is not depicted in FIG. 7, the present invention proposes a method of updating and managing average data transmission rate satisfaction updated and managed after data transmission between a transmission UE and a reception UE is completed based on the sub channel included in the scheduling signal.

Each of reception UEs belonging to each multicast group receives data based on the sub channel included in the scheduling signal and then transmits transmission rate measurement information signal including information on whether the data is successfully received (e.g., ACK or NACK) and information on an amount of received data to the base station.

If a transmission failure is reported based on the received transmission rate measurement information, the base station can perform such an operation as retransmission and the like, update the average data transmission rate demand information of the reception UE and can separately store or manage the information in an internal memory of the base station.

In this case, updating and managing the information on the average data transmission rate correspond to a process necessary for securing the extent of the average data transmission rate demand of the reception UE. The updated average data transmission rate satisfaction of the reception UE can be additionally used when the base station generates representative information of each multicast group.

In this case, average data transmission rate demand information of an $i^{th}$ reception UE of a multicast group k can be updated via Formula 4 in the following in every time slot.

$$\lambda_{k_i}^{(t+1)} \leftarrow [\lambda_{k_i}^{(t)} - \alpha^{(t)} v_{k_i}^{(t)}]^+, \text{ where } v_{k_i}^{(t)} = R_{k_i}^{(t)} - \gamma_k \quad \text{[Formula 4]}$$

In particular, average data transmission rate demand information of a reception UE used in a next time slot is reduced when data transmission rate of a current time slot is greater than a demanded data transmission rate. On the contrary, the average data transmission rate demand information of the reception UE used in the next time slot increases when the data transmission rate of a current time slot is less than the demanded data transmission rate. In Formula 4, a (alpha) indicates a step size, an upper subscript of each variable indicates a time slot and definition on other variables is shown in Table 1.

Figure 8:
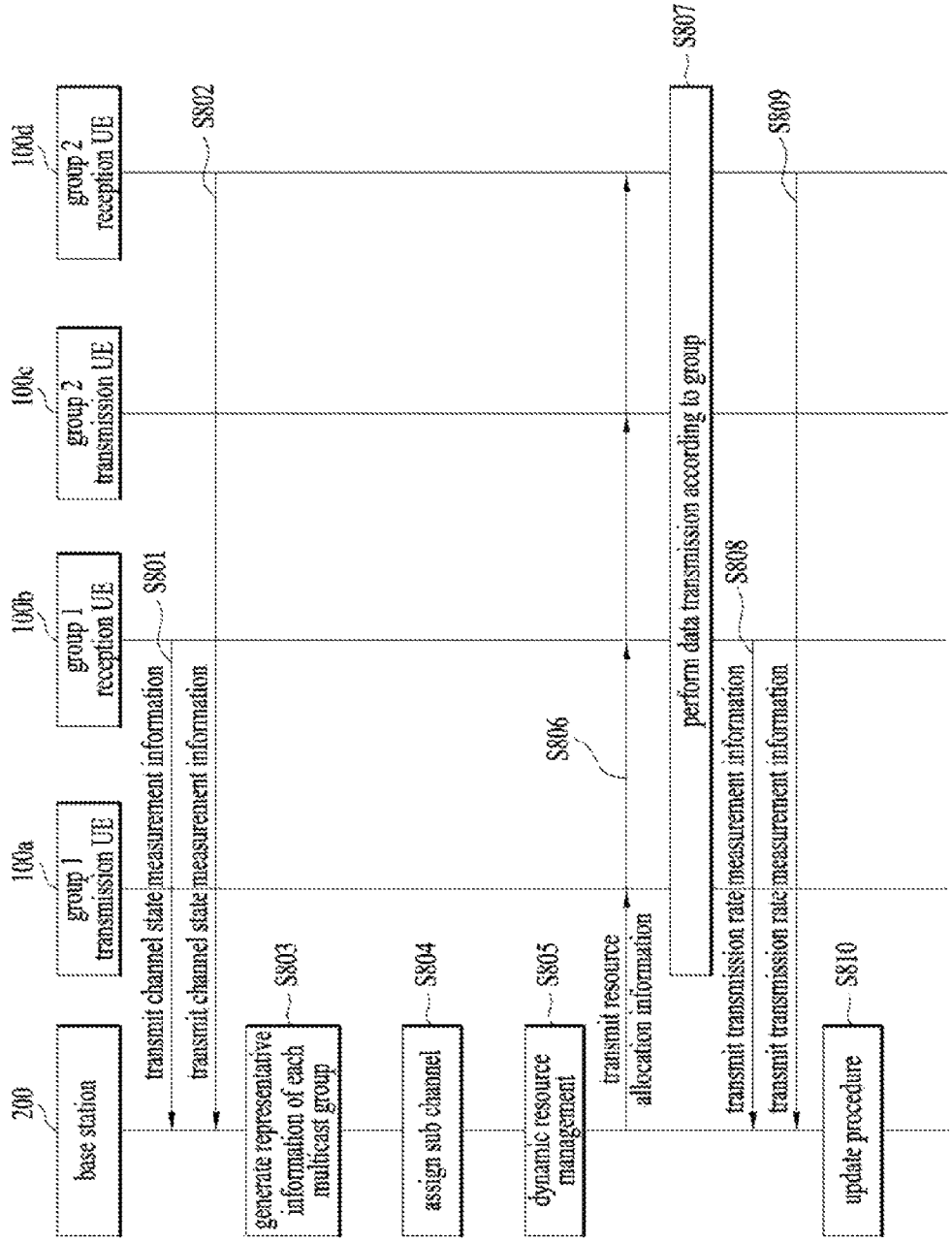
FIG. 8 is a flowchart for an example of a method of performing scheduling for D2D multicast communication according to one embodiment of the present invention.

FIG. 8 is a flowchart for an example of a method of performing scheduling for D2D multicast communication according to one embodiment of the present invention.

As shown in FIG. 8, a wireless communication system supporting D2D communication can include one or more multicast groups including a multicast group 1 and a multicast group 2 and a base station. The multicast group 1 and the multicast group 2 can include a transmission UE 100a/100c and a reception UE 100b/100d, respectively. Although it is not depicted in FIG. 8, the reception UE belonging to each of the multicast groups consists of one or more reception UEs.

Referring to FIG. 8, it shows a procedure of transmitting a scheduling signal transmitted by the base station for D2D multicast communication.

First of all, each reception UE 100b/100d belonging to each of the multicast groups participating in the D2D multicast communication can transmit channel state measurement information to the base station 200 [S801, S802].

The channel information transmitted by each reception UE indicates channel information on all sub channels between each reception UE and all transmission UEs. The channel information can be transmitted using a resource predetermined for the D2D communication on PUSCH of LTE network, an additional control channel D2DCCH (D2D control channel) for the D2D communication, or the like depending on a system.

Having received the channel information from each reception UE, the base station 200 can generate representative information of each multicast group [S803].

The representative information can be generated using average traffic satisfaction for each reception UE belonging to one or more multicasts managed by the base station and the channel information received in the step S801 and the step S802. The representative information can be calculated by Formula 1 mentioned in the foregoing description. Each variable used by Formula 1 has a meaning identical to meaning of a variable shown in Table 1.

Meanwhile, having generated the representative information of each multicast group in the step S803, the base station 200 searches for an optimal reuse set in every sub channel of the wireless communication system using the generated representative information of each multicast group and calculates sum of the representative information of the multicast group included in the optimal reuse set.

And, the base station 200 can determine whether to use each sub channel for the D2D multicast communication by comparing a result of the calculation with a predetermined system constant C.

More specifically, sum of representative information of each multicast group included in the optimal reuse set is compared with the predetermined system constant C in every sub channel. If a calculated value is greater than the system constant C, a sub channel including the calculated value greater than the system constant C is used for the D2D multicast communication and scheduling is performed in a manner that the sub channel is assigned using the optimal reuse set [S804].

Yet, if the calculated value is less than the system constant C, since all reception UEs satisfy average data transmission rate without using the sub channel, the sub channel is not used for the D2D communication in a corresponding time slot and the base station can dynamically use the sub channel [S805].

Meanwhile, the base station 200 can inform all UEs 100a/100b100c/100d participating in the D2D multicast communication belonging to each multicast group of the scheduling information determined in the step S804 [S806].

The transmission UE 100a/100c can identify a sub channel on which data is to be transmitted via the scheduling information and the reception UE 100b/100d can identify a sub channel on which data is to be received via the scheduling information.

And, the scheduling information can be transmitted using a resource predetermined for the D2D communication on PDSCH of LTE network or an additional control channel D2DCCH for the D2D communication depending on a system.

Having received the scheduled resource, the transmission UE 100a/100c belonging to each multicast group can transmit data to the reception UE 100b/100d using the received scheduled resource and the reception UE can receive a corresponding signal [S807].

In the step S807, having received the data from the transmission UE 100a/100c, all reception UEs 100b/100d belonging to each multicast group can transmit transmission rate measurement information including information on whether the data is successfully transmitted, an amount of received data and the like to the base station 200 [S808, S809].

The transmission rate measurement information can be used for the base station 200 to calculate transmission rate satisfaction of each reception UE 100b/100d and can be used for data retransmission and the like according to transmission failure and the like.

The transmission rate measurement information can be transmitted using a resource predetermined for the D2D communication on PUSCH of LTE network or an additional control channel D2DCCH for the D2D communication depending on a system.

Meanwhile, the base station 200 can update the average data transmission rate satisfaction of each reception UE 100b/100d based on the transmission rate measurement information received in the step S808 and S809 and can separately store or update the updated average data transmission rate satisfaction in a memory of the base station.

And, although it is not depicted in FIG. 8, the base station 200 can repeatedly perform the aforementioned scheduling in a manner of reflecting the updated average data transmission rate satisfaction to the scheduling.

Figure 9:
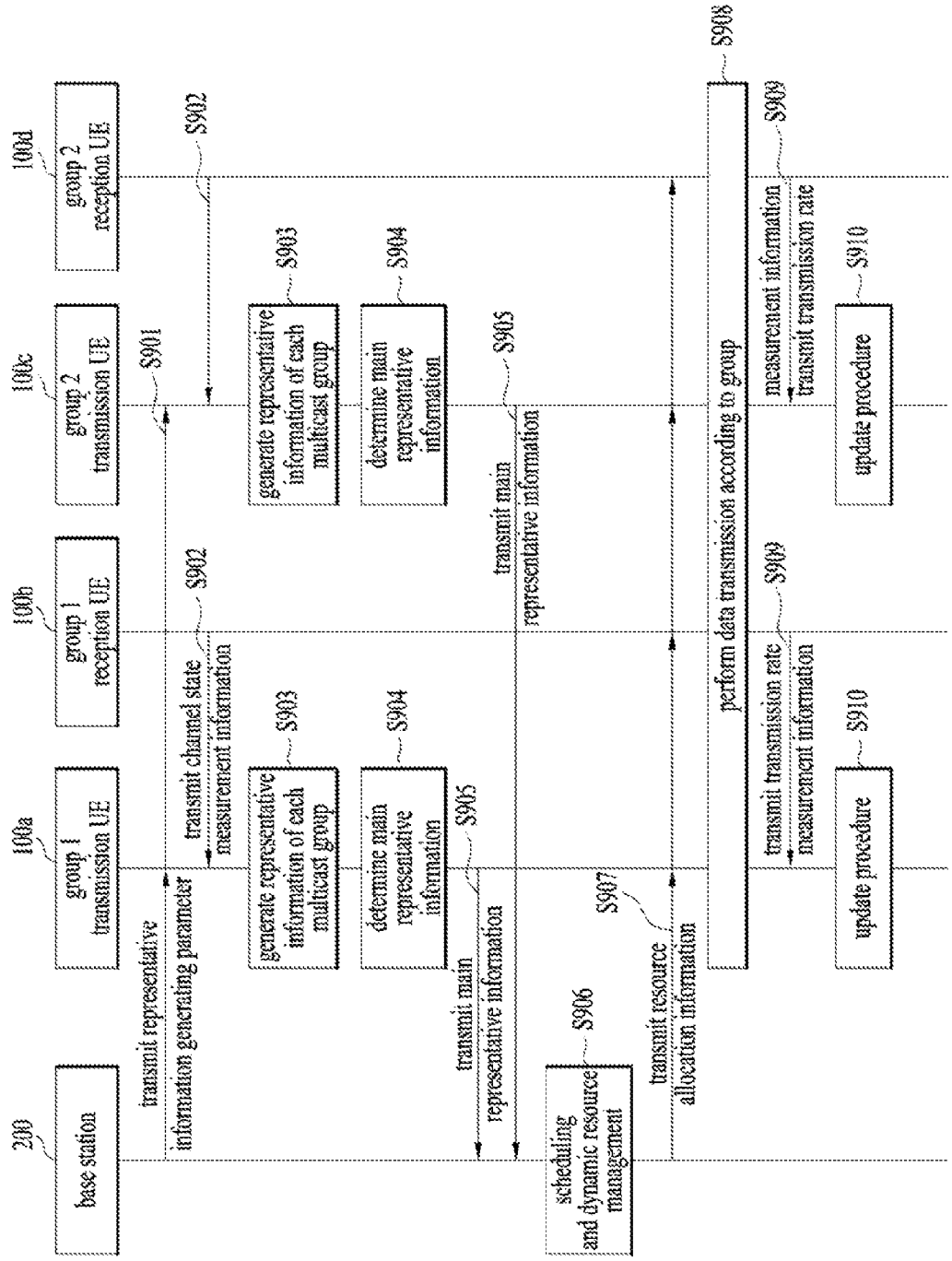
FIG. 9 is a flowchart for an example of a method for a D2D transmission user equipment to transmit a signal for D2D multicast communication according to one embodiment of the present invention.

FIG. 9 is a flowchart for an example of a method for a D2D transmission user equipment to transmit a signal for D2D multicast communication according to one embodiment of the present invention.

Unlike a method of transmitting a signal to schedule D2D multicast communication in a wireless communication system mentioned earlier in FIG. 8, FIG. 9 proposes a method for a D2D transmission UE to preferentially receive channel state measurement information measured by a D2D reception UE belonging to a multicast group, process the channel state measurement information and report a result of the processing to a base station to reduce an amount of resource used for transmitting the channel state measurement information and scheduling complexity, secure average data transmission rate of the D2D reception UE and enhance efficiency of use of a radio resource. The method proposed in FIG. 9 is explained in more detail in the following.

Referring to FIG. 9, a transmission UE 100a/100c belonging to a multicast group can receive a representative information generating parameter transmitted from a base station 200 [S901].

The representative information generating parameter is used when each of the transmission UEs 100a/100c selects a single main representative information to be reported to the base station from multicast group representative information. The representative information generating parameter corresponds to a parameter in which a trade-off between the number of interference sets and weighted achievable sum-rate is considered.

As shown in FIG. 8, the base station can inform each transmission UE of the representative information generating parameter in a manner of appropriately determining a parameter value predetermined in a system according to a network situation. Unlike FIG. 8, a transmission UE may determine the representative information generating parameter in a manner of actively identifying a network situation.

Reception UEs can measure channel state, which is transceived with all transmission UEs, on all sub channels used for D2D communication via a channel state measurement process of the sub channels used for the D2D communication. The reception UEs can transmit the measured channel state measurement information to a transmission UE belonging to a multicast group in which the reception UEs are included [S902].

In this case, the channel state measurement information can include information on a sub channel used for D2D communication between the reception UE and a transmission UE belonging to each of one or more multicast groups.

More specifically, the channel state measurement information can include identifier information of a transmission UE causing $m^{th}$ strong interference to the reception UE on a specific sub channel among one or more sub channels in the wireless communication system and information on a data transmission rate when transmission UEs except transmission UEs ranging from a transmission UE causing the strongest interference to the transmission UE causing the $m^{th}$ strong interference cause interference on the specific sub channel.

For instance, an $i^{th}$ reception UE belonging to a multicast group k can transmit channel state measurement information including information in the following to a transmission UE belonging to the multicast group in response to all sub channels.

1. ID (identifier) of a transmission UE causing $m^{th}$ strong interference to an $i^{th}$ reception UE on a sub channel n 2. Data transmission rate when all transmission UEs except transmission UEs ranging from a transmission UE causing the strongest interference to a transmission UE causing the $m^{th}$ strong interference cause interference to an $i^{th}$ reception UE on a sub channel n In this case, the ID of the transmission UE and the data transmission rate can be represented as Formula 5 and Formula 6, respectively. Variables included in Formula 5 and Formula 6 can be defined as Table 2 in the following.

$$l_{k_i}^n(m) \quad \text{[Formula 5]}$$

$$R_{k_i}^n(m) \quad \text{[Formula 6]}$$

In this case, a value of the m can be flexibly determined by the reception UE according to network performance of the wireless communication system to improve scheduling performance in accordance with a network situation.

In this case, the channel state measurement information can be transmitted on a control channel (D2DCCH) predetermined for the D2D communication or a channel predetermined for the D2D communication on a physical UL shared channel (PUSCH).

Moreover, a resource of a D2D control channel used for the reception UE to transmit the channel state measurement information to a transmission UE belonging to a corresponding multicast group can be reused between one or more multicast groups.

In particular, each of reception UEs belonging to multicast groups different from each other can report the channel state measurement information to a transmission UE belonging to a corresponding multicast group using an identical resource (e.g., a D2D control channel) in the wireless communication system. This is originated from proximity between a transmission UE and a reception UE in a multicast group in D2D communication.

Meanwhile, having received the channel state measurement information from each of the reception UEs, each of the transmission UEs 100a/100b belonging to the multicast group can generate representative information of each multicast group based on the received channel state measurement information and average data transmission rate demand information of each of the reception UEs belonging to the multicast group [S903].

In particular, a transmission UE generates representative information of a multicast group using received channel information and an average data transmission rate of reception UEs. In this case, the representative information of the multicast group has a different value according to each sub channel and a reuse set.

As mentioned in the foregoing description, it is important to maintain characteristic of D2D multicast scheduling satisfying an average data transmission rate of a reception UE and efficiently utilizing a resource while reducing an amount of information to be transmitted to an base station.

Hence, a main entity of generating representative information of a multicast group may become a transmission UE according to one embodiment of the present invention. The transmission UE receives channel state measurement information from a reception UE and may be then able to generate representative information of each multicast group.

And, an amount (or the number) of the representative information of the multicast group generated by the transmission UE may vary depending on a transmission UE causing $i^{th}$ strong interference reported by the reception UE via the channel state measurement information.

For instance, as mentioned in the foregoing description, if a transmission UE receives channel state measurement information including an identifier and transmission rate in which a transmission UE causing $m^{th}$ strong interference to a reception UE is considered from the reception UE, the representative information can be generated for such information as strongest interference to the $m^{th}$ strong interference, respectively.

Meanwhile, the representative information of the multicast group generated by the transmission UE is explained in more detail with a concrete example in the following. In particular, $m^{th}$ representative information of a multicast group generated by a transmission UE belonging to a multicast group k in response to a sub channel n is explained in the following.

1. An interference set including identifiers (IDs) of transmission UEs causing $m^{th}$ strong interference to a reception UE belonging to the multicast group k on the sub channel n and an identifier (ID) of the transmission UE belonging to the multicast group k 2. When all transmission UEs except transmission UEs ranging from a transmission UE causing strongest interference to a transmission UE causing $m^{th}$ strong interference to the reception UE cause interference to the reception UE, a data transmission rate and a weighted achievable sum-rate, which is calculated in consideration of data transmission rate and the extent of average data transmission rate demand of reception UEs belonging to the multicast group.

In this case, the interference set and the weighted achievable sum-rate can be represented as Formula 7 and Formula 8, respectively. Variables included in Formula 7 and Formula 8 can be defined as Table 2 in the following.

$$B^n(k,m) \quad \text{[Formula 7]}$$

$$\xi^n(k,m) \quad \text{[Formula 8]}$$

And, a method of generating the interference set and the weighted achievable sum-rate included in the representative information can be represented as Formula 9 and Formula 10, respectively. Variables included in Formula 9 and Formula 10 can be defined as Table 2 in the following.

$$B^n(k, m) = \{l_{ID}(k)\} U \bigcup_{i \in u_k} \{l^n_{k_i}(1), l^n_{k_i}(2), \ldots, l^n_{k_i}(m)\}$$ [Formula 9]

$$\xi^n(k, m) = \sum_{i \in u_k} \lambda_{k_i} R^n_{k_i}(m)$$ [Formula 10]

indicates a multicast group not using each sub channel at the same time to obtain average data transmission rate demand information reported by a reception UE.

And, the weighted achievable sum-rate, which is different information included in the representative information of multicast group, indicates the extent of scheduling demand of the multicast group in which data transmission rate reported via channel state measurement information and data transmission rate demand information of the reception UEs are considered.

TABLE 2

| | |
|---|---|
| n | Sub channel index |
| k | Multicast group index |
| $k_i$ | $i^{th}$ reception UE belonging to multicast group k |
| $l_{ID}$ (k) | ID of transmission UE belonging to multicast group k |
| $l_{k_i}^n$ (m) | Transmission UE causing $m^{th}$ strong interference on sub channel n |
| $R_{k_i}^n$ (m) | Data transmission rate when all transmission UEs except transmission UEs ranging from transmission UE causing strongest interference to transmission UE causing $m^{th}$ strong interference cause interference on sub channel n |
| $R^n$ (k, m) | Interferer set including IDs of transmission UEs causing $m^{th}$ strong interference to reception UEs belonging to multicast group k on the sub channel n and ID of transmission UE belonging to multicast group k |
| $\xi^n$ (k, m) | weighted achievable sum-rate, which is calculated in consideration of data transmission rate of transmission UEs belonging to multicast group k except transmission UEs causing $m^{th}$ strong interference on sub channel n and average data transmission rate satisfaction of reception UEs belonging to multicast group |
| $U_k$ | Set of reception UEs belonging to multicast group k |
| $h_{k_i,j}^n$ | Channel gain between transmission UE belonging to multicast group j and $i^{th}$ reception UE belonging to multicast group k on sub channel n |
| p | Transmission power |
| $N_0$ | Thermal noise |
| $\lambda_{k_i}$ | Average data transmission rate satisfaction of $i^{th}$ reception UE belonging to multicast group k |
| α | Step size |
| $R_{k_i}$ (t) | Average data transmission rate of $i^{th}$ reception UE belonging to multicast group k in corresponding time slot |
| $Y_k$ | Average data transmission rate demand of multicast group k |
| C | System constant used for determining whether to use sub channel |
| ρ | Parameter considering trade-off between $|B^n$ (m, k)$|$ and $\xi^n$ (k, m) |

Referring back to FIG. 9, having generated the representative information of the multicast group in the step S903, each of the transmission UEs 100a/100c can determine a single representative information (hereinafter main representative information) to be reported to the base station among the generated representative information of the multicast group [S904].

As mentioned in the foregoing description, if a transmission UE determines the main representative information and transmits the main representative information to a base station according to one embodiment of the present invention, an amount of information to be transmitted to the base station is reduced and an amount of resource necessary for transmitting information can also be reduced. By doing so, total scheduling performance may have big difference according to the main representative information of a multicast group selected by the transmission UE.

Thus, in case of selecting the main representative information, which is one of the generated multicast representative information, a criterion of selecting the main representative information is very important to maintain a strong point of the D2D multicast scheduling. Hence, the present invention proposes a method of selecting the main representative information capable of maintaining the strong point of the D2D multicast scheduling using a representative information parameter value according to a network situation.

Meanwhile, the aforementioned interference set included in the representative information of the multicast group In this case, information on the interference set and information on the weighted achievable sum-rate included in representative information of each multicast group have characteristics in the following.

1. If there are many elements in the interference set, it may mean that there is less multicast group capable of using a resource at the same time with a multicast group k on a sub channel n.

2. If the weighted achievable sum-rate is high, it may mean that a data transmission rate capable of being obtained by reception UEs belonging to a corresponding multicast group is high and the extent of resource allocation demand is high.

A D2D multicast scheduling method is briefly explained. The method includes a process of performing scheduling by searching for an optimal reuse set satisfying following conditions in every sub channel.

1. The optimal reuse set is not included in interference sets of multicast groups included in a reuse set.

2. Sum of weighted achievable sum-rate of multicast groups included in a reuse set is maximized.

As mentioned in the foregoing description, since the D2D multicast scheduling method performs scheduling by searching for a reuse set maximizing the sum of weighted achievable sum-rate in every sub channel, if representative information of a multicast group has characteristic in the following on a sub channel n, the representative information may correspond to very profitable representative information in terms of scheduling performance maintenance.

1. When reuse of a sub channel with a plurality of different multicast groups is available since the number of interference sets is less enough 2. When a weighted achievable sum-rate has a big value since a data transmission rate capable of being obtained by reception UEs is superior and the extent of scheduling demand is high Yet, in case of representative information of a multicast group, as the representative information more reports transmission UE causing interference, both elements included in the interference set and a value of the weighted achievable sum-rate are increasing.

In particular, as an m value of the representative information is getting bigger, both the number of the interference sets and the weighted achievable sum-rate are increasing.

The number of the interference sets increases as the m value, which is reported by a reception UE, indicating the number of transmission UEs causing interference is increasing. The weighted achievable sum-rate increases as the m value is increasing since the number of the transmission UEs causing interference, which is reflected in the course of calculating minimum data transmission rate capable of being obtained by a reception UE, is reduced.

Hence, it is necessary to select appropriate main representative information in consideration of a trade-off between the number of interference sets and the weighted achievable sum-rate when a transmission UE selects main representative information to be reported to a base station to maintain performance of the scheduling method.

In this case, the trade-off indicates a relation between obtaining something and losing a different thing.

For instance, in case of selecting multicast representative information including a big m in all groups, since both the weighted achievable sum-rate and the number of interference sets are increasing, a gain capable of being obtained by reusing each sub channel by a plurality of multicast groups is reduced, thereby degrading performance of the scheduling method.

On the contrary, in case of selecting multicast representative information including a small m, since the number of interference sets is small, a sub channel can be reused by a plurality of multicast groups. Yet, due to interference resulted from the reuse of a plurality of the multicast groups, the weighted achievable sum-rate is reduced and the performance of the scheduling method may be degraded.

Hence, the present invention proposes a method of maintaining the strong point of the D2D multicast scheduling by using a representative information parameter controlling a trade-off between the number of interference sets and the weighted achievable sum-rate among the aforementioned representative information of the multicast group and the method for a transmission UE to select a single main representative information from the m number of multicast representative information. The method is explained in more detail in the following.

In particular, according to the method of selecting the main representative information, the main representative information is determined in a manner that the number of interference sets included in each of the m number of multicast group representative information and a size of the weighted achievable sum-rate are compared with each other.

The method of determining the main representative information determined by the transmission UE of the multicast group k using the method can be represented as Formula 11 in the following. Definition on variables included in Formula 11 is shown in Table 2.

$$\operatorname*{argmax}_{m} \frac{(1+\xi^n(k,m))^\rho}{|B^n(k,m)|}, \text{ where } 0 < \rho < \infty \quad \text{[Formula 11]}$$

In Formula 11, ρ corresponds to a representative information parameter considering a trade-off between the number of interference sets and a weighted achievable sum-rate. If the ρ corresponds to 0, Formula 11 becomes (1/the number of interference sets). Hence, the number of interference sets selects a smallest m. If the ρ corresponds to ∞, the weighted achievable sum-rate selects a biggest m.

In this case, a base station may appropriately determine a parameter value predetermined in a system as the representative information parameter according to a network situation and may inform each transmission UE of the representative information parameter. On the contrary, a transmission UE may determine the representative information parameter by actively identifying a network situation.

Meanwhile, the transmission UE can transmit the main representative information determined by the aforementioned method to the base station [S905]. The transmission UE may transmit the main representative information to the base station in a manner of transmitting a representative information report signal including the determined main representative information to the base station. In this case, the transmission can be performed on a control channel (D2DCCH) predetermined for the D2D communication or a channel predetermined for the D2D communication on physical UL shared channel (PUSCH).

Subsequently, the base station 200 can perform scheduling in a manner of assigning a sub channel to each of multicast groups based on the received main representative information [S906].

More specifically, the base station 200 can determine a reuse set simultaneously using each sub channel according to one or more sub channels in the wireless communication system using the received main representative information to perform the scheduling.

In this case, the base station should determine an optimal reuse set by utilizing main representative information of multicast groups included in each of the reuse sets which is determined according to a sub channel.

The main representative information of the multicast groups corresponds to a value in which the extent of scheduling demand of each group and a current channel situation are considered. Hence, as the value is getting bigger, it means that the extent of scheduling demand is bigger and the current channel situation is better.

Hence, an optimal reuse set of each sub channel corresponds to a reuse set of which sum of the main representative information of the multicast groups included in a reuse set is biggest.

In this case, if all reception UEs satisfy average data transmission rate without using a corresponding sub channel, the base station is able to dynamically utilize the sub channel for a different purpose without utilizing the sub channel for D2D multicast communication.

If the sum of the representative information of the multicast groups included in the optimal reuse set is smaller than a system constant C predetermined in a system, it means that all reception UEs can satisfy the average data transmission rate without using the sub channel.

Hence, if the sum of the representative information of the multicast groups included in the optimal reuse set is smaller than the system constant C predetermined in a system, the sub channel is not used for the D2D communication. Instead, the base station can dynamically utilize the sub channel for a different communication (e.g., general wireless communication).

On the contrary, if the sum of the representative information of the multicast groups included in the optimal reuse set is greater than the system constant C predetermined in a system, since it means that all reception UEs satisfy average data transmission rate only when the sub channel is used, the base station performs scheduling by assigning the sub channel.

Subsequently, the base station can transmit a scheduling signal including the assigned sub channel to each UE belonging to the multicast group [S907]. The scheduling signal can be transmitted on a control channel (D2DCCH) predetermined for the D2D communication or a channel predetermined for the D2D communication on physical DL shared channel (PDSCH).

Meanwhile, data transmission can be performed between a transmission UE according to a multicast group and a reception UE based on the sub channel included in the scheduling signal [S908]. After the data transmission is completed, the transmission UE can update and manage average data transmission rate demand information of each reception UE based on a result of the data transmission.

More specifically, each of the reception UEs belonging to a multicast group can transceive data with the transmission UE based on the sub channel included in the scheduling signal which is received in the step S907 and can transmit a transmission rate measurement information signal including information on whether the data is successfully received (e.g., ACK or NACK) and information on an amount of received data to the transmission UE after the data is transmitted and received [S909].

If a transmission failure is reported based on the received transmission rate measurement information, the transmission UE may perform such an operation as retransmission and the like. The transmission UE can update average data transmission rate demand information of the reception UE in every time slot [S910] and can separately store or manage the average data transmission rate demand information of the reception UE in an internal memory of the transmission UE.

In this case, the information on the average data transmission rate is updated and managed to secure the extent of average data transmission rate demand of the reception UE. The updated average data transmission rate satisfaction of the reception UE can be additionally used when the transmission UE generates representative information of each multicast group.

Figure 10:
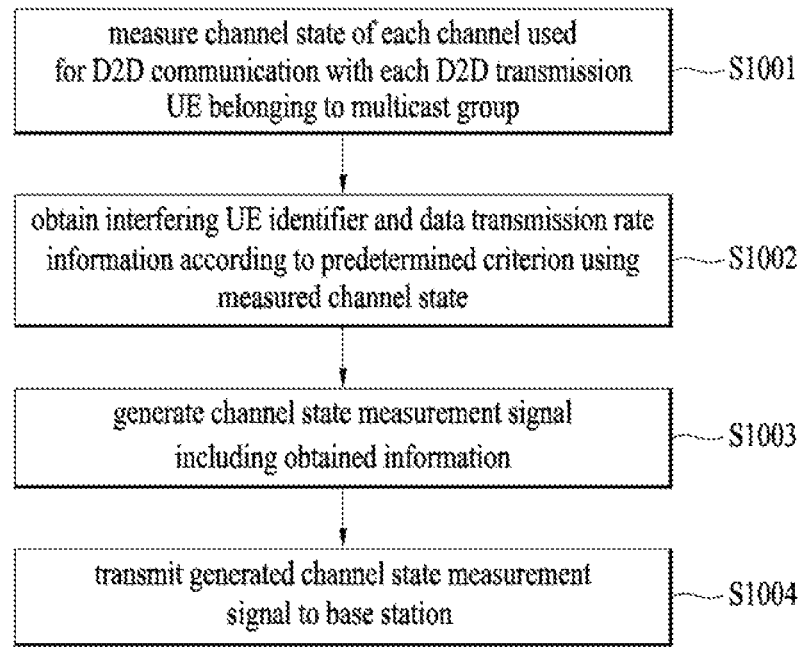
FIG. 10 is a flowchart of a method for a D2D reception user equipment to transmit a channel state measurement signal for D2D multicast communication according to one embodiment of the present invention.

FIG. 10 is a flowchart of a method for a D2D reception user equipment to transmit a channel state measurement signal for D2D multicast communication according to one embodiment of the present invention.

Unlike a method of transmitting a signal to schedule D2D multicast communication in a wireless communication system mentioned earlier in FIG. 8, FIG. 10 proposes a method for a D2D transmission UE to preferentially process channel state measurement information measured by a D2D reception UE belonging to a multicast group without reporting all of the information to a base station and report processed specific information to the base station only to reduce an amount of resource used for transmitting the channel state measurement information and scheduling complexity, secure average data transmission rate of the D2D reception UE and enhance efficiency of use of a radio resource. The method proposed in FIG. 10 is explained in more detail in the following.

For clarity, contents identical to what is mentioned in the foregoing description are omitted at this time.

Referring to FIG. 10, a reception UE can measure a channel state of each sub channel used for D2D communication with one or more transmission UEs belonging to a multicast group [S1001].

More specifically, the channel information can include channel state information of a sub channel between the reception UE and each of the one or more transmission UEs belonging to the multicast group.

Having measured the channel state in the step S1001, the reception UE can generate a channel state measurement signal for D2D multicast communication scheduling using the measured channel state information.

More specifically, the reception UE obtains identifier information of a transmission UE causing strongest interference on each sub channel and information on a data transmission rate when transmission UEs except the transmission UE causing the strongest interference cause interference on each sub channel and can generate a channel state measurement signal including the obtained information [S1002, S1003].

Since the reception UE knows channel information of all sub channels used for D2D communication according to the channel state measurement process performed in the step S1001, the identifier information of the transmission UE corresponds to information capable of being known via the channel state information by the reception UE.

And, as mentioned earlier in FIG. 9, according to one embodiment of the present invention, identifier information of the transmission UE causing the strongest interference, the information on the data transmission rate when transmission UEs except the transmission UE causing the strongest interference cause interference on each sub channel, and information (identifier information and information on transmission rate) on transmission UEs ranging from the transmission UE causing the strongest interference to a transmission UE causing $m^{th}$ strong interference can be included in the channel state measurement information.

And, according to embodiment of the present invention, a value of the m can be flexibly determined by the reception UE according to a size of the interference caused by the transmission UE on each sub channel.

Referring back to FIG. 10, the reception UE can transmit the channel state measurement signal generated in the step S1003 to the base station [S1004].

And, the channel state measurement signal can be transmitted on a control channel (D2DCCH) predetermined for the D2D communication or a channel predetermined for the D2D communication on physical UL shared channel (PUSCH).

Meanwhile, although it is not depicted in FIG. 10, the base station can generate representative information of each multicast group based on the received channel state measurement information and the average data transmission rate of reception UEs.

In particular, the base station generates the representative information of each multicast group using the received channel state measurement information and the average data transmission rate of reception UEs.

In this case, the representative information of the multicast group may vary depending on a report of a reception UE belonging to each multicast group reporting a transmission UE causing $i^{th}$ strong interference.

Meanwhile, although it is not depicted in FIG. 10, the base station generates representative information of a multicast group according to each su channel based on the channel state measurement information received in the step S1004 and performs scheduling by utilizing the representative information.

As mentioned in the foregoing description, it is necessary for the base station to schedule in consideration of the extent of scheduling demand of each multicast group while multicast groups included in an interference set do not use a corresponding sub channel at the same time.

In particular, the base station searches for available reuse sets using interference set information included in the representative information in every sub channel, determines an optimal reuse set among the available reuse sets in consideration of the extent of scheduling demand of each multicast group and performs scheduling by utilizing the determined optimal reuse set.

A process of determining the optimal reuse set is explained in the following. First of all, for clarity, a case that the reception UE reports feedback information on the transmission UE causing strongest interference to the base station is explained. Conditions for becoming a reuse set in the case are explained in the following.

1. A reuse set is a subset of a set of all multicast groups.
2. Multicast groups included in a reuse set should not be included in an interference set of each group.

Mostly, there exists a plurality of reuse sets satisfying the aforementioned conditions. The base station determines a reuse set of which sum of weighted achievable sum-rate of multicast groups included in the reuse set is biggest as an optimal reuse set among a plurality of the reuse sets.

In this case, if all reception UEs belonging to the optimal reuse set satisfy average data transmission rate without using a corresponding sub channel, the base station is able to dynamically utilize the sub channel for a different purpose without utilizing the sub channel for D2D multicast communication.

In particular, in order to determine whether all reception UEs belonging to the optimal reuse set satisfy the average data transmission rate without using the sub channel, the base station can use the representative information of the multicast groups. This is because the extent of scheduling demand of each group is reflected to the representative information.

Hence, if the sum of the weighted achievable sum-rate of the multicast groups included in the optimal reuse set is smaller than a system constant C predetermined in a system, it means that all reception UEs can satisfy the average data transmission rate without using a sub channel n.

On the contrary, if the sum of the weighted achievable sum-rate of the multicast groups included in the optimal reuse set is greater than the system constant C predetermined in a system, it means that all reception UEs can satisfy the average data transmission rate only when the sub channel n is used. Hence, the base station performs scheduling by assigning the sub channel n.

If the aforementioned method is extended to a situation of reporting channel state measurement information related to a transmission UE causing $m^{th}$ strong interference, since a plurality of the representative information are generated according to each multicast group, the base station should consider not only a multicast group of the representative information but also an order of the representative information in the multicast group.

In particular, an element included in a reuse set is changed to a tuple of two indexes indicating an order of representative information in a multicast group from an index of the multicast group.

For instance, $m^{th}$ representative information of a multicast group k is represented as (k, m). In this case, the base station also searches for available reuse sets and determines an optimal reuse set among the available reuse sets in consideration of the extent of scheduling demand of each multicast group. In this case, conditions for becoming a reuse set are explained in the following.

1. A reuse set is a subset of a set of all tuples indicating a multicast group and an order of representative information of the multicast group.
2. A multicast group of tuples included in a reuse set should not be included in an interference set of multicast group representative information included in each tuple.

Since an interference set of representative information of each multicast group includes an identifier (ID) of a transmission UE of the multicast group, representative information different from each other in an identical multicast group are not included in a reuse set by the second condition.

In case of extending transmitted channel state measurement information up to a UE causing $m^{th}$ strong interference, similar to a case that a reception UE transmits channel state measurement information on a transmission UE causing the strongest interference, a reuse set of which sum of weighted achievable sum-rate of representative information of a multicast group corresponding to a tuple included in the reuse set is biggest is determined as an optimal reuse set and it may be able to determine whether to use a sub channel in a manner of comparing the value and a system constant C with each other.

And, the present invention proposes a method of using a graph theory as one of the aforementioned method of searching for an optimal reuse set according to each sub channel. First of all, a system model used for searching for an optimal reuse set on a sub channel n can be represented by a graph in the following.

1. Vertex
A tuple (k, m) indicating a multicast group and an order of representative information in the multicast group
2. Edge
Two vertexes (x, y) are connected with each other when y and x are not included in an interference set, respectively. If the y is included in an interference set or the x is included in an interference set, the two vertexes are not connected with each other.

In particular, each vertex corresponds to each tuple indicating representative information and weight of each vertex is given by weighted achievable sum-rate of a corresponding tuple. An edge connecting the two vertexes with each other is connected when multicast groups of tuples are not included in an interference set of representative information indicated by the two tuples corresponding to the two vertexes. If a multicast group of one tuple is included in the interference set of another tuple, the two vertexes are not connected with each other.

If a graph is configured using the aforementioned scheme, a problem of searching for an optimal reuse set on a corresponding sub channel is replaced with a maximum weighted clique problem of the graph. Hence, the problem of searching for the optimal reuse set can be solved using a legacy maximum weighted clique algorithm.

Meanwhile, as mentioned in the foregoing description, if sum of the weighted achievable sum-rate of the multicast groups included in the optimal reuse set, which is determined according to the aforementioned method, is greater than a system constant C predetermined in a system, it means that all reception UEs satisfy average data transmission rate only when a sub channel n is used. In this case, the base station performs scheduling by assigning the sub channel n.

Although it is not depicted in FIG. 10, as mentioned in the foregoing description, data transmission can be performed between a transmission UE and a reception UE based on the sub channel included in the scheduling signal. After the data transmission is completed, the base station can update and manage average data transmission rate satisfaction of each reception UE based on a result of the data transmission.

The reception UE belonging to the multicast group receives data based on the sub channel included in the scheduling signal and then transmits a transmission rate measurement information signal including information on whether the data is successfully received (e.g., ACK or NACK) and information on an amount of received data to the base station.

If a transmission failure is reported based on the received transmission rate measurement information, the base station may perform such an operation as retransmission and the like. The base station can update average data transmission rate demand information of the reception UE in every time slot and can separately store or manage the average data transmission rate demand information of the reception UE in an internal memory of the base station.

In this case, the information on the average data transmission rate is updated and managed to secure the extent of average data transmission rate demand of the reception UE. The updated average data transmission rate satisfaction of the reception UE can be additionally used when the base station generates representative information of each multicast group.

Figure 11:
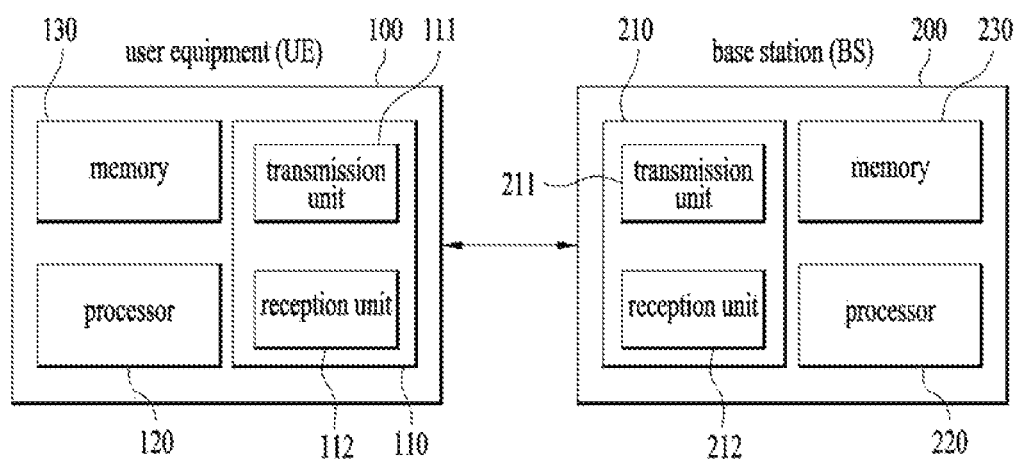
FIG. 11 is a diagram for an example of a device transmitting a scheduling signal for D2D multicast communication according to one embodiment of the present invention.

FIG. 11 is a diagram for an example of a device transmitting a scheduling signal for D2D multicast communication according to one embodiment of the present invention.

Although FIG. 11 shows one-to-one communication environment between a UE 100 and a base station 200, communication environment can be constructed between a plurality of UEs and a base station.

And, assume that each of a UE 100 and a base station 200 corresponding to components shown in FIG. 11 includes a transmission UE, a reception UE and a base station mentioned earlier in FIG. 1 to FIG. 10, respectively.

First of all, a base station 200 is explained. The base station includes an RF (radio frequency) unit 210 including a transmission unit 211 and a reception unit 212, a processor 220 and a memory 230.

And, overall process of communication such as a signal processing of the base station 200, a layer processing and the like are controlled by the processor 220 and the memory 230. A connection relation can be formed between the RF unit 210, the processor 220 and the memory 230.

The RF unit 210 included in the base station 200 can include the transmission unit 211 and the reception unit 212. The transmission unit 211 and the reception unit 212 can be configured to transmit and receive a signal between the UE 100 and the base station 200.

The processor 220 is functionally connected with the transmission unit 211 and the reception unit 212 included in the RF unit and can be configured to control a process of transmitting and receiving a signal between the UE 100 and the base station 200. And, the processor 220 performs various processing on a signal to be transmitted and transmits the signal to the transmission unit 211. The reception unit 212 can perform processing on the received signal.

If necessary, the processor 220 may store information included in an exchanged message in the memory 230. With the aforementioned structure, the base station 200 can perform the aforementioned various embodiments of the present invention.

Subsequently, the UE 100 includes an RF unit 110 including a transmission unit 111 and a reception unit 112. The RF unit 110 is configured to transceive a signal with the base station 200.

And, the processor 120 of the UE 100 is functionally connected with the transmission unit 111 and the reception unit 112 and can be configured to control the transmission unit 111 and the reception unit 112 to perform a process of transceiving a signal with different devices including the base station 200.

The processor 120 performs various processing on a signal to be transmitted and transmits the signal to the transmission unit 111. The reception unit 112 can perform processing on the received signal.

If necessary, the processor 120 may store information included in an exchanged message in the memory 130.

The processors 120/220 of the UE 100 and the base station 200 indicate (e.g., control, adjust, manage etc.) operations of the UE 100 and the base station 200. Each of the processors 120/220 can be connected with the memory 130.230 capable of storing program codes and data. The memory 130/230 is connected with the processor 120/220 and can store an operating system, an application and general files.

The processor 120/220 of the present invention can be called a controller, a microcontroller, a microprocessor, a microcomputer or the like. Meanwhile, the processor 120/220 can be implemented by hardware, firmware, software or a combination thereof.

In case of the implementation by firmware or software, one embodiment of the present invention can be implemented by modules, procedures, and/or functions for performing the above-explained functions or operations. Software code is stored in a memory 130/230 and is then drivable by a processor 120/220. The memory is provided within or outside of the UE 100 and the eNB 200 to exchange data with the processor 120/220 through the various means known in public.

In the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like installed in the processor 120/220.

Meanwhile, the aforementioned method can be written by a program executable in a computer and can be implemented by a common digital computer capable of operating the program. And, a data structure used for the aforementioned method can be recorded by various means in a computer-readable media. Program storing devices usable for explaining a storing device, which includes an executable computer code configured to perform various methods of the present invention, should not be understood as a device including such temporary objects as carrier waves and signals. The computer-readable media includes such a storing media as a magnetic storing media (e.g., a ROM, a floppy disc, a hard disc and the like) and an optical reading media (e.g., a CD-ROM, a DVD and the like).

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

INDUSTRIAL APPLICABILITY

A method of performing scheduling for D2D multicast communication in a wireless communication system can be applied to various systems and apparatus performing scheduling.

What is claimed is:

1. A method of performing scheduling for device-to-device (D2D) multicast communication in a wireless communication system, the method performed by a base station and comprising:
    receiving channel state measurement information from each of D2D reception user equipments (UEs) belonging to one or more multicast groups;
    generating representative information on each of the one or more multicast groups based on the received channel state measurement information and average data transmission rate demand information of each of the D2D reception UEs;
    scheduling by assigning a sub channel on which the D2D multicast communication is to be performed to each of the one or more multicast groups based on the generated representative information; and
    transmitting a scheduling signal containing information on the assigned sub channel to each D2D reception UE belonging to the one or more multicast groups,
    wherein the channel state measurement information comprises identifier information of a transmission UE causing $m^{th}$ strong interference to the D2D reception UE on a specific sub channel among one or more sub channels in the wireless communication system and information on a data transmission rate when transmission UEs except transmission UEs ranging from a transmission UE causing strongest interference to the transmission UE causing the $m^{th}$ strong interference cause interference on each of the one or more sub channels, and
    wherein a value of the m is determined by the D2D reception UE according to network performance of the wireless communication system.

2. The method of claim 1,
    wherein each of the one or more multicast groups comprises one D2D transmission UE and one or more D2D reception UEs, and
    wherein the average data transmission rate demand information comprises information on a predetermined amount of data reception demand per unit time of the D2D reception UE.

3. The method of claim 1, wherein the scheduling performing step further comprises:
    determining a reuse set for each of one or more sub channels in the wireless communication system to simultaneously use each of the one or more sub channels based on the representative information; and
    performing scheduling by assigning the sub channel based on the determined one or more reuse sets.

4. The method of claim 3, wherein the reuse set is determined as a set of multicast groups having a largest sum of the representative information among sets of one or more multicast groups to simultaneously use a specific sub channel among the one or more sub channels.

5. The method of claim 4,
    wherein the scheduling performing step further comprises the step of comparing the sum of the representative information between one or more multicast groups contained in the determined reuse set with a predetermined system constant, and
    wherein if the sum of the representative information of the reuse set is greater than the system constant, a sub channel corresponding to the reuse set is dynamically used for a communication other than the D2D communication.

6. The method of claim 1, further comprising:
    receiving transmission rate measurement information containing information on whether data is successfully received and information on an amount of received data from each of the D2D reception UEs, which has performed data communication, belonging to the one or more multicast groups based on the assigned sub channel; and
    updating average data transmission rate demand information for each of the D2D reception UEs belonging to the one or more multicast groups based on the transmission rate measurement information.

7. A method of transmitting a signal for D2D multicast communication scheduling in a wireless communication system, the method performed by a device-to-device (D2D) transmission user equipment (UE) belonging to a multicast group and comprising:
    receiving channel state measurement information from each of D2D reception UEs belonging to the multicast group;
    generating one or more representative information on the multicast group based on the received channel state measurement information and average data transmission rate demand information of each of the D2D reception UEs;
    determining a single main representative information to be transmitted to a base station according to a predetermined criterion among the generated representative information; and
    transmitting a representative information report signal containing the determined main representative information to the base station,
    wherein the channel state measurement information comprises identifier information of a transmission UE causing $m^{th}$ strong interference to the D2D reception UE on a specific sub channel among one or more sub channels in the wireless communication system and information on a data transmission rate when other transmission UEs except transmission UEs ranging from a transmission UE causing strongest interference to the transmission UE causing the $m^{th}$ strong interference cause interference on each of the one or more sub channels, and
    wherein a value of the m is determined by the D2D reception UE according to network performance of the wireless communication system.

8. The method of claim 7,
    wherein the predetermined criterion includes determining the main representative information using a representative information parameter controlling a trade-off between a number of interference sets and a weighted achievable sum-rate, and wherein the representative information parameter is capable of being received from the base station.

9. The method of claim 7, wherein the transmitted main representative information is used for determining a reuse set to simultaneously use each of one or more sub channels in the wireless communication in the base station according to the sub channel and performing scheduling by assigning the sub channel based on the one or more determined reuse sets, and wherein the reuse set is determined as a set of multicast groups having a largest sum of the main representative information among sets of one or more multicast groups to simultaneously use a specific sub channel among the one or more sub channels.

10. The method of claim 7, wherein each of reception of the channel state measurement information and transmission of the representative information report signal is performed on a control channel (D2DCCH) predetermined for the D2D communication or a channel predetermined for the D2D communication on a physical uplink shared channel (PUSCH).

11. The method of claim 7, further comprising:

receiving transmission rate measurement information containing information on whether data is successfully received and information on an amount of received data from each of the D2D reception UEs, which has performed data communication, belonging to the multicast group based on the main representative information; and updating average data transmission rate demand information for each of the D2D reception UEs belonging to the multicast group based on the transmission rate measurement information.

12. A method of transmitting a channel state measurement signal for D2D multicast communication scheduling in a wireless communication system, the method performed by a device-to-device (D2D) reception user equipment (UE) belonging to a multicast group and comprising:

measuring a channel state of each of sub channels used for performing D2D communication with a D2D transmission UE belonging to one or more multicast groups;

generating a channel state measurement signal for the D2D multicast communication scheduling using the measured channel state; and transmitting the generated channel state measurement signal to a base station, wherein the channel state measurement signal comprises identifier information of a transmission UE causing strongest interference on each of the sub channels and information on a data transmission rate when other transmission UEs except the transmission UE causing the strongest interference on each of the sub channels cause interference, wherein the channel state measurement information further comprises identifier information of a transmission UE causing $m^{th}$ strong interference on each of the sub channels and information on a data transmission rate when other transmission UEs except transmission UEs ranging from the transmission UE causing the strongest interference to the transmission UE causing $m^{th}$ strong interference on each of the sub channels cause interference, and wherein a value of the m is determined by the D2D reception UE according to network performance of the wireless communication system.

13. The method of claim 12, wherein the transmitted channel state measurement information is used for the base station to generate average data transmission rate demand information of the D2D reception UE and representative information for each of the one or more multicast groups, wherein the average data transmission rate demand information comprises information on a predetermined amount of data reception demand per unit time, and wherein the representative information is generated as many as a number corresponding to the value of the m.

14. The method of claim 13, wherein the generated representative information is used for determining a reuse set to simultaneously use each of the sub channels in the base station according to the sub channel and performing scheduling by assigning the sub channel based on the determined one or more reuse sets.

15. The method of claim 14, wherein transmission rate measurement information containing information on whether data is successfully received and information on an amount of received data is transmitted to the base station after data communication is performed on the assigned sub channel based on the representative information, and wherein the transmission rate measurement information is used for the base station to update the average data transmission rate demand information.

16. A device performing scheduling for device-to-device (D2D) multicast communication in a wireless communication system, the device comprising:

a transmitter configured to transmit radio frequency (RF) signal;

a receiver configured to receive RF signal; and a processor configured to support communication performance of the device in a manner of being connected with the transmitter and the receiver, wherein the processor configured to:

receive channel state measurement information from each of D2D reception user equipments (UEs) belonging to one or more multicast groups, generate representative information on each of the one or more multicast groups based on the received channel state measurement information and average data transmission rate demand information of each of the D2D reception UEs, perform scheduling by assigning a sub channel on which the D2D multicast communication is to be performed to each of the one or more multicast groups based on the generated representative information, control a scheduling signal containing information on the assigned sub channel to be transmitted to each D2D reception UE belonging to the one or more multicast groups, wherein the channel state measurement information comprises identifier information of a transmission UE causing $m^{th}$ strong interference to the D2D reception UE on a specific sub channel among one or more sub channels in the wireless communication system and information on a data transmission rate when transmission UEs except transmission UEs ranging from a transmission UE causing strongest interference to the transmission UE causing the $m^{th}$ strong interference cause interference on each of the one or more sub channels, and wherein a value of the m is determined by the D2D reception UE according to network performance of the wireless communication system.

17. A device transmitting a signal for device-to-device (D2D) multicast communication scheduling in a wireless communication system, the device comprising:
a transmitter configured to transmit radio frequency (RF) signal;
a receiver configured to receive RF signal; and
a processor configured to support communication performance of the device in a manner of being connected with the transmitter and the receiver,
wherein the processor configured to:
receive channel state measurement information from each of D2D reception user equipments (UEs) belonging to the multicast group,
generate one or more representative information on the multicast group based on the received channel state measurement information and average data transmission rate demand information of each of the D2D reception UEs,
determine a single main representative information to be transmitted to a base station according to a predetermined criterion among the generated representative information and
transmit a representative information report signal containing the determined main representative information to the base station,
wherein the channel state measurement information comprises identifier information of a transmission UE causing $m^{th}$ strong interference to the D2D reception UE on a specific sub channel among one or more sub channels in the wireless communication system and information on a data transmission rate when transmission UEs except transmission UEs ranging from a transmission UE causing strongest interference to the transmission UE causing the $m^{th}$ strong interference cause interference on each of the one or more sub channels, and
wherein a value of the m is determined by the D2D reception UE according to network performance of the wireless communication system.

18. A device transmitting a channel state measurement signal for device-to-device (D2D) multicast communication scheduling in a wireless communication system, the device comprising:
a transmitter configured to transmit radio frequency (RF) signal;
a receiver configured to receive RF signal; and
a processor configured to support communication performance of the device in a manner of being connected with the transmitter and the receiver,
wherein the processor configured to:
measure a channel state of each of sub channels used for performing D2D communication with a D2D transmission user equipment (UE) belonging to one or more multicast groups,
generate a channel state measurement signal for the D2D multicast communication scheduling using the measured channel state,
control the generated channel state measurement signal to be transmitted to a base station,
wherein the channel state measurement signal comprises identifier information of a transmission UE causing strongest interference on each of the sub channels and information on a data transmission rate when other transmission UEs except the transmission UE causing the strongest interference on each of the sub channels cause interference,
wherein the channel state measurement information further comprises identifier information of a transmission UE causing $m^{th}$ strong interference on each of the sub channels and information on a data transmission rate when other transmission UEs except transmission UEs ranging from the transmission UE causing the strongest interference to the transmission UE causing $m^{th}$ strong interference on each of the sub channels cause interference, and
wherein a value of the m is determined by the D2D reception UE according to network performance of the wireless communication system.

* * * * *